United States Patent
Lee et al.

(10) Patent No.: US 9,819,596 B2
(45) Date of Patent: Nov. 14, 2017

(54) EFFICIENT POLICY ENFORCEMENT USING NETWORK TOKENS FOR SERVICES C-PLANE APPROACH

(71) Applicant: QUALCOMM Incorporated, San Diego, CA (US)

(72) Inventors: Soo Bum Lee, San Diego, CA (US); Gavin Bernard Horn, La Jolla, CA (US); John Wallace Nasielski, San Diego, CA (US); Stefano Faccin, Hayward, CA (US)

(*) Notice: Subject to any disclaimer, the term of this patent is extended or adjusted under 35 U.S.C. 154(b) by 48 days.

(21) Appl. No.: 14/832,965

(22) Filed: Aug. 21, 2015

(65) Prior Publication Data
US 2016/0248686 A1    Aug. 25, 2016

Related U.S. Application Data

(60) Provisional application No. 62/120,135, filed on Feb. 24, 2015.

(51) Int. Cl.
*H04L 1/00* (2006.01)
*H04L 12/859* (2013.01)
(Continued)

(52) U.S. Cl.
CPC .......... *H04L 47/2475* (2013.01); *H04L 45/38* (2013.01); *H04L 47/20* (2013.01);
(Continued)

(58) Field of Classification Search
CPC ..... H04L 47/2475; H04L 45/38; H04L 47/20; H04L 47/215; H04L 47/2483; H04L 63/0227
(Continued)

(56) References Cited

U.S. PATENT DOCUMENTS

| 7,916,700 | B2  | 3/2011  | Hurtta |
|-----------|-----|---------|--------|
| 8,855,594 | B2* | 10/2014 | Suh ........................ H04W 4/22 370/259 |

(Continued)

FOREIGN PATENT DOCUMENTS

| EP | 1332627 A2 | 8/2003 |
| EP | 2670174 A2 | 12/2013 |

(Continued)

OTHER PUBLICATIONS

Partial International Search Report—PCT/US2016/018104—ISA/EPO—dated Nov. 3, 2016.
(Continued)

*Primary Examiner* — Faisal Choudhury
(74) *Attorney, Agent, or Firm* — Qualcomm IP Dept.; James Hunt Yancey, Jr.

(57) ABSTRACT

A device establishes flows associated with one or more applications using control plane signaling. A gateway device obtains a request for a network token during the control plane signaling. The gateway device derives the network token and sends it to the device and/or an access node during the control plane signaling. The device and/or access node obtain the network token, where the network token is associated with a first flow of the one or more flows, a first application of the one or more applications, and provisioned to the device or access node via the control plane signaling. The network token may be included in a packet sent in the user plane from the device. The network token may be verified at the access node and/or the gateway device using a cryptographic function and sent to its destination based on the results of the verification.

43 Claims, 25 Drawing Sheets

(51) Int. Cl.
*H04L 12/721* (2013.01)
*H04L 12/813* (2013.01)
*H04L 12/819* (2013.01)
*H04L 12/851* (2013.01)
*H04L 29/06* (2006.01)

(52) U.S. Cl.
CPC ........ *H04L 47/215* (2013.01); *H04L 47/2483* (2013.01); *H04L 63/0227* (2013.01)

(58) Field of Classification Search
USPC .......................................................... 370/236
See application file for complete search history.

(56) References Cited

U.S. PATENT DOCUMENTS

| | | | |
|---|---|---|---|
| 8,913,987 B2 | 12/2014 | Lee et al. | |
| 2010/0189114 A1* | 7/2010 | Oishi | H04L 29/12839 370/400 |
| 2011/0171953 A1* | 7/2011 | Faccin | H04W 48/08 455/426.1 |
| 2012/0020318 A1* | 1/2012 | Naoe | H04W 8/26 370/329 |
| 2012/0243547 A1 | 9/2012 | Pardo-Blazquez et al. | |
| 2013/0003697 A1* | 1/2013 | Adjakple | H04W 36/0011 370/331 |
| 2014/0308918 A1 | 10/2014 | Lee et al. | |
| 2015/0009988 A1* | 1/2015 | Lim | H04L 47/2458 370/389 |
| 2015/0031336 A1 | 1/2015 | Mathias et al. | |
| 2015/0067328 A1 | 3/2015 | Yin | |
| 2015/0264739 A1* | 9/2015 | Hurtta | H04W 4/005 370/329 |
| 2015/0280926 A1* | 10/2015 | Yamada | H04B 7/14 370/259 |
| 2016/0044485 A1* | 2/2016 | Enomoto | H04W 76/023 455/41.2 |
| 2016/0113053 A1* | 4/2016 | Chuang | H04W 76/027 370/329 |
| 2016/0277956 A1* | 9/2016 | Lindheimer | H04W 36/22 |
| 2016/0353498 A1* | 12/2016 | Enomoto | H04W 60/04 |
| 2016/0381620 A1* | 12/2016 | Panaitopol | H04W 28/0257 370/315 |

FOREIGN PATENT DOCUMENTS

| | | |
|---|---|---|
| WO | WO-2013010567 A1 | 1/2013 |
| WO | WO-2013017176 A1 | 2/2013 |
| WO | WO-2014207550 A2 | 12/2014 |

OTHER PUBLICATIONS

International Search Report and Written Opinion—PCT/US2016/018104—ISA/EPO—dated Jan. 18, 2017.

* cited by examiner

EFFICIENT POLICY ENFORCEMENT USING NETWORK TOKENS FOR SERVICES C-PLANE APPROACH

This application claims priority to U.S. Provisional Application No. 62/120,135, filed Feb. 24, 2015, titled Efficient Policy Enforcement Using Network Access Tokens For Services C-Plane Approach, the contents of which are incorporated by reference herein.

FIELD

One aspect generally relates to network tokens, and more specifically to the derivation, provisioning, and use of network tokens that are associated with data flows to facilitate packet steering and/or verification that a device is accessing only authorized application services.

BACKGROUND

Some client devices may have network access, but their network access may be limited to a set of application services. In one example, a client device's network access may be sponsored by a particular application service provider. The client device may be limited to application services run by the application service provider on its server. In another example, a client device with network access may be part of a contract that allows for special charging or handling of data (e.g., bit rate of quality of service) associated with a given application service. For example, a client device may have a cellular subscription through a cellular provider and that cellular provider may wish to impose one or more restrictions on the client device. In one example, a corporation that is today known as a provider of social media, but not known as a cellular provider, may play a role as a cellular provider. In this example, the client device may have a subscription with the corporation. As part of its subscription agreement, the client device may gain access to the Internet but may be restricted to use the social media site of the corporation to the exclusion of other social media sites. By way of another example, a client device may have a subscription with a provider of streaming media services. In this example, as part of an agreement, the client device may gain access to the Internet through various cellular providers but may be restricted by agreement (between the provider of streaming media services and the various cellular providers and/or the user of the client device) to use the site of the provider of media services for all streaming media services. By way of still another example, for certain access point names (APNs), only certain traffic may be allowed to be sent from a client device based on a policy or subscription limitation.

Policies may be instituted in connection with application services to ensure that a client device is not violating any agreements, is being provided access to a given application service, and/or is being provided with an agreed upon level of service. Such policies may be enforced against uplink (UL) packets sent from a client device toward, for example, a server on a packet data network (e.g., the Internet).

Today, policy enforcement for application services occurs at a gateway to a network. An example of such a gateway is a packet data network gateway (P-GW), which serves as a gateway between a network core (e.g., evolved packet core (EPC)) and a packet data network, such as the Internet. One problem exists in that enforcement of service access policies may require a P-GW to validate all UL packets sent from a client device. Moreover, each UL packet may need to be steered to its destination address via a particular bearer.

Validation of UL packets at the P-GW may be needed to ensure that a client device is only sending packets to an authorized application service. Validation may include verifying the destination address or the destination address and the port number of packets passing through the P-GW. Additionally, verifying the source address of each packet may be useful for anti-spoofing (e.g., by preventing packets from unauthorized client devices from fooling the system by appearing to come from an authorized client device). Packet steering may be needed to ensure that an agreed upon quality of service (QoS) is achieved.

Current practices incur substantial overhead and add forwarding latency due to processing delay. The current practice is typically realized using packet inspection (e.g., deep packet inspection, shallow packet inspection) and traffic flow template (TFT) and service data flow (SDF) templates. The P-GW confirms that the UL packets conform to a TFT/SDF template defined for the service(s) by inspecting the headers of each packet.

Fine-grain policy control (e.g., per application) is difficult because additional policy control would incur additional overhead and processing delay because a packet would need to be tested against additional filtering rules realized by TFT/SDF templates. Furthermore, use of TFT/SDF templates is not scalable for sponsored connectivity. An increase in the number of sponsors of different services (perhaps thousands of services in the years to come) would mean an increase in the time needed to filter packets through a correspondingly increased number of TFT/SDF templates. This, again, would incur additional overhead and processing delay.

What is required is an alternative to supplement and/or enhance packet inspection.

SUMMARY

According to one aspect, a method may be operational at a device. The method may include establishing a set of one or more flows associated with one or more applications using control plane signaling and obtaining, at the device during the control plane signaling, a first network token. The first network token may be associated with a first flow of the set of one or more flows, associated with a first application of the one or more applications, and provisioned to the device via the control plane signaling. The method may also include sending the first network token from the device with a packet that is associated with the first flow. According to some aspects, the method may include sending the first network token from the device with every packet sent from the device that is associated with the first flow. The first network token may be derived in accordance with a network access policy. It may be used to steer a packet in the first flow to the first application.

The first network token may be provisioned in response to an explicit or an implicit request for the first network token. The implicit request may include one of a packet data network (PDN) connection request message, a dedicated bearer activation request message, or a bearer modification request message.

According to some aspects, the first network token may be transported from the device to a gateway device in a shim header in a shim layer between an Internet protocol (IP) layer and a medium access control (MAC) layer, a packet data convergence protocol (PDCP) header, and/or an IP extension header as defined in IP version 6 (IPv6). When transported in the shim header, the first network token may be transparent to an access node. According to some aspects, the first network token may be transported from the device to an access node in a shim header in a shim layer between an Internet protocol (IP) layer and a medium access control (MAC) layer, and/or a packet data convergence protocol (PDCP) header.

According to some aspects, a second network access token may be obtained at the device during the control plane signaling. The second network token may be derived by a second device that is different from a first device that derived the first token. It may be associated with the first flow of the set of one or more flows, associated with the first application of the one or more applications, and provisioned to the device via the control plane signaling.

The device may include a network interface and a processing circuit coupled to the network interface. The processing circuit may be configured to establish a set of one or more flows associated with one or more applications using control plane signaling, obtain, at the device during the control plane signaling, a network token, wherein the network token is associated with a first flow of the set of one or more flows, associated with a first application of the one or more applications, and provisioned to the device via the control plane signaling.

According to one aspect, a method, operational at a gateway device, may include obtaining, at the gateway device, a request for a network token during control plane signaling associated with data connection setup, activation, or modification associated with a client device. The method may further include deriving, at the gateway device, the network token, the network token associated with a flow and an application service in accordance with an access policy and sending, via control plane signaling, the network token to the client device or to an access node associated with the client device during the control plane signaling. The network token may be used to steer packets transiting between the client device and the application service during transmission over a network through the gateway device. The request for the network token may be explicit. The request for the network token may be implicit. The request may be implicitly recognized upon obtaining, at the gateway device a packet data network (PDN) connection request, a dedicated bearer activation request, or a bearer modification request.

According to one aspect, the derivation of the network token may be based on a secret key specific to an access node to which the client device is attached. A method according to such an aspect may include sending the secret key to the access node.

According to one aspect, the network token may be derived as an uplink network token and a downlink network token, different from the uplink network token. Derivation of the uplink network token may be based a key known to the gateway device and on a parameter associated with the client device. Derivation of the downlink network token may be based on the key known to the gateway device and on a parameter associated with an application server. According to such an aspect, the method may include sending the uplink network token and the downlink network token to the client device.

According to one aspect, a gateway device may obtain a first packet including the network token. The gateway device may steer the first packet between the client device and the application service using data associated with the network token included with the first packet without use of packet inspection. The gateway device may verify the network token using a key known to the gateway device. The gateway device may act by discarding the first packet including the network token if the verifying is not successful. The gateway device may act by steering first packet between the client device and the application service using the network token included with the first packet without use of packet inspection if the verifying is successful. Verifying the network token may include deriving a verification network token from a function having a set of input parameters including the key known to the gateway device, and a network token parameter index, source Internet protocol (IP) address, source port number, destination IP address, destination port number, protocol identifier (ID), application ID, priority, and/or a quality of service class identifier (QCI). Verifying may then further include comparing the network token to the verification network token. In some aspects, the network token parameter index, source Internet protocol (IP) address, source port number, destination IP address, destination port number, protocol identifier (ID), application ID, priority, and/or quality of service class identifier (QCI) are obtained from the packet.

According to some aspects, a method may include identifying a network token parameter index prior to verifying the network token, wherein the network token parameter index defines a list of input parameters. Such a method may also include deriving a verification network token from a function having, as input, the key known to the gateway device and the list of input parameters. The network token parameter index may define an application identifier (ID). The list of input parameters may be stored in a table in the gateway device. The network token may be carried in a shim header separate from an IP header. The network token may be carried in a general packet radio service (GPRS) tunneling protocol (GTP) header. The network token may be carried in an IP extension header defined in Internet protocol (IP) version 6 (IPv6).

According to one aspect, a gateway device may include a network interface and a processing circuit coupled to the network interface. The processing circuit may be configured to obtain a request for a network token during control plane signaling associated with data connection setup, activation, or modification associated with a client device, obtain the network token, the network token associated with a flow and an application service in accordance with an access policy, and send, via control plane signaling, the network token to the client device or to an access node associated with the client device during the control plane signaling.

According to some aspects, a method, operational at an access node, may include obtaining, at the access node during control plane signaling, a network token. The network token may be associated with a first flow of a set of one or more flows, associated with a first application of one or more applications, and provisioned to the access node via the control plane signaling. The method may further include sending, from the access node, the network token with a packet associated with the first flow. The method may further include sending, from the access node, the network token with every packet associated with the first flow. The network token may be associated with the set of one or more flows associated with the one or more applications.

According to another aspect, a method, operational at an access node, may include obtaining, in control plane signaling, a secret key specific to the access node from a gateway device. The method may further include obtaining, in user plane signaling, a packet at the access node from a client device, the packet including a network token. The access node may act by verifying the network token using a secret key specific to the access node obtained from the gateway device and sending the packet and network token to the gateway device if the network token is verified, or discarding the packet and network token if the network token is not verified. The network token may be carried in a general packet radio service (GPRS) tunneling protocol (GTP) header to the gateway device. The network token may be copied from a packet data convergence protocol (PDCP) header to a general packet radio service tunneling protocol header (GTP header) and carried in the GTP header to the gateway device. According to some aspects, the network token is to enforce an access policy associated with an application service and the secret key specific to the access node is to validate the network token included in packets received at the access node before sending the packets to the gateway device to prevent unauthorized packets from reaching the gateway device.

According to one aspect, an access node may include a network interface and a processing circuit coupled to the network interface. The processing circuit may be configured to obtain, in control plane signaling, a secret key specific to the access node from a gateway device. The processing circuit may be further configured to obtain, in user plane signaling, a packet at the access node from a client device, the packet including a network token. The processing circuit may be still further configured to verify the network token using a secret key specific to the access node obtained from a gateway device and either send the packet and network token to a gateway device if the network token is verified, or discard the packet and network token if the network token is not verified.

According to some aspects, a method, operational at a gateway device, may include obtaining, at the gateway device, a packet from an application server. The packet may include a downlink network token. The method may include verifying the downlink network token using a key known to the gateway device, discarding the packet if the verifying is not successful, and discarding the downlink network token and sending the packet to a client device based on parameters represented by the downlink network token if the verifying is successful. The packet may be an Internet protocol (IP) data packet.

DRAWINGS

DETAILED DESCRIPTION

In the following description, reference is made to the accompanying drawings in which is shown, by way of illustration, specific embodiments in which the disclosure may be practiced. The embodiments are intended to describe aspects of the disclosure in sufficient detail to enable those skilled in the art to practice the invention. Other embodiments may be utilized and changes may be made to the disclosed embodiments without departing from the scope of the disclosure. The following detailed description is not to be taken in a limiting sense, and the scope of the present invention is defined only by the appended claims.

The term "device" may be used herein to refer to a chip component and/or a client device, such as a "mobile device", "mobile phone", "mobile communication devices", "mobile computing devices", "digital tablets", "smart phones", "user equipment", "user device", "terminal" among other devices.

Operational Environment

Figure 1:
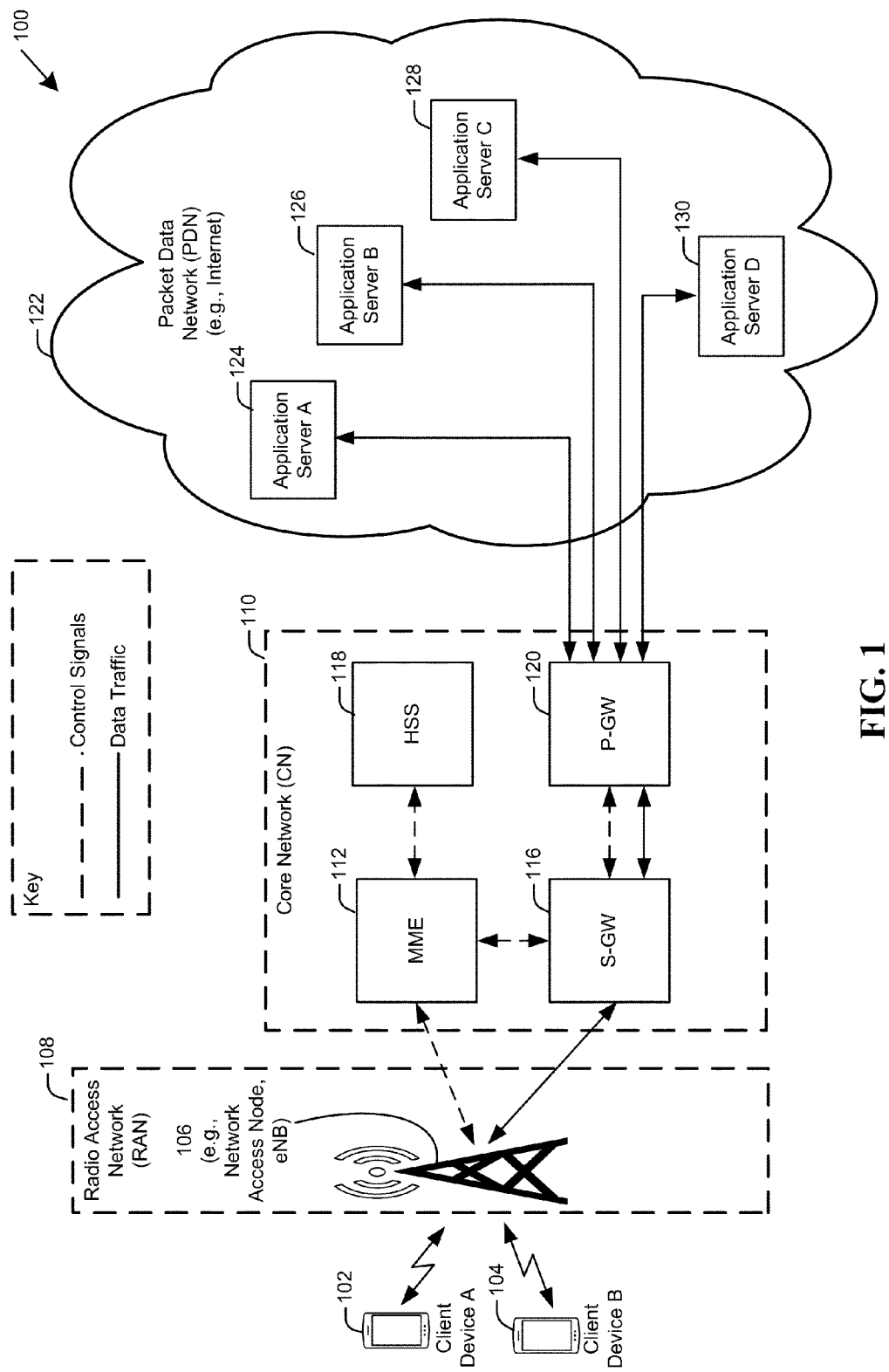
FIG. 1 illustrates an exemplary operating environment.

FIG. 1 illustrates an exemplary operating environment 100. In such an exemplary operating environment 100 one or more client devices 102, 104 (e.g., client device A, client device B) may communicate wirelessly with an access node 106 (e.g., Node B, eNodeB, access point (AP)). The access node 106 may be included within a radio access network (RAN) 108 (e.g., evolved universal terrestrial radio access network (E-UTRAN)). As known to those of skill in the art, the RAN 108 typically includes more than one access node 106. Only one access node 106 is illustrated to reduce clutter in the drawing. In a non-limiting example of a cellular communication system (e.g., 4G, LTE, LTE-A) the RAN 108 may communicate control signals and data traffic to a core network (CN) 110 (e.g., evolved packet core (EPC)). In the illustration of FIG. 1, broken lines represent control signal paths and solid lines represent data traffic paths. Control signals are said to be conveyed via a control plane. User data is said to be conveyed via a user plane.

A CN 110 may include a mobility management entity (MME) 112, a serving gateway (S-GW) 116, a home subscriber server (HSS) 118, and a packet data network gateway (P-GW) 120. The P-GW 120 may communicate with a packet data network (PDN) 122 (e.g., the Internet). More specifically, the P-GW 120 may communicate with servers 124, 126, 128, 130 (e.g., application servers) in the PDN 122. The servers 124, 126, 128, 130 may be associated with service providers, such as, for example, service providers that provide sales service, information services, streaming video services, and social media services.

Figure 2:
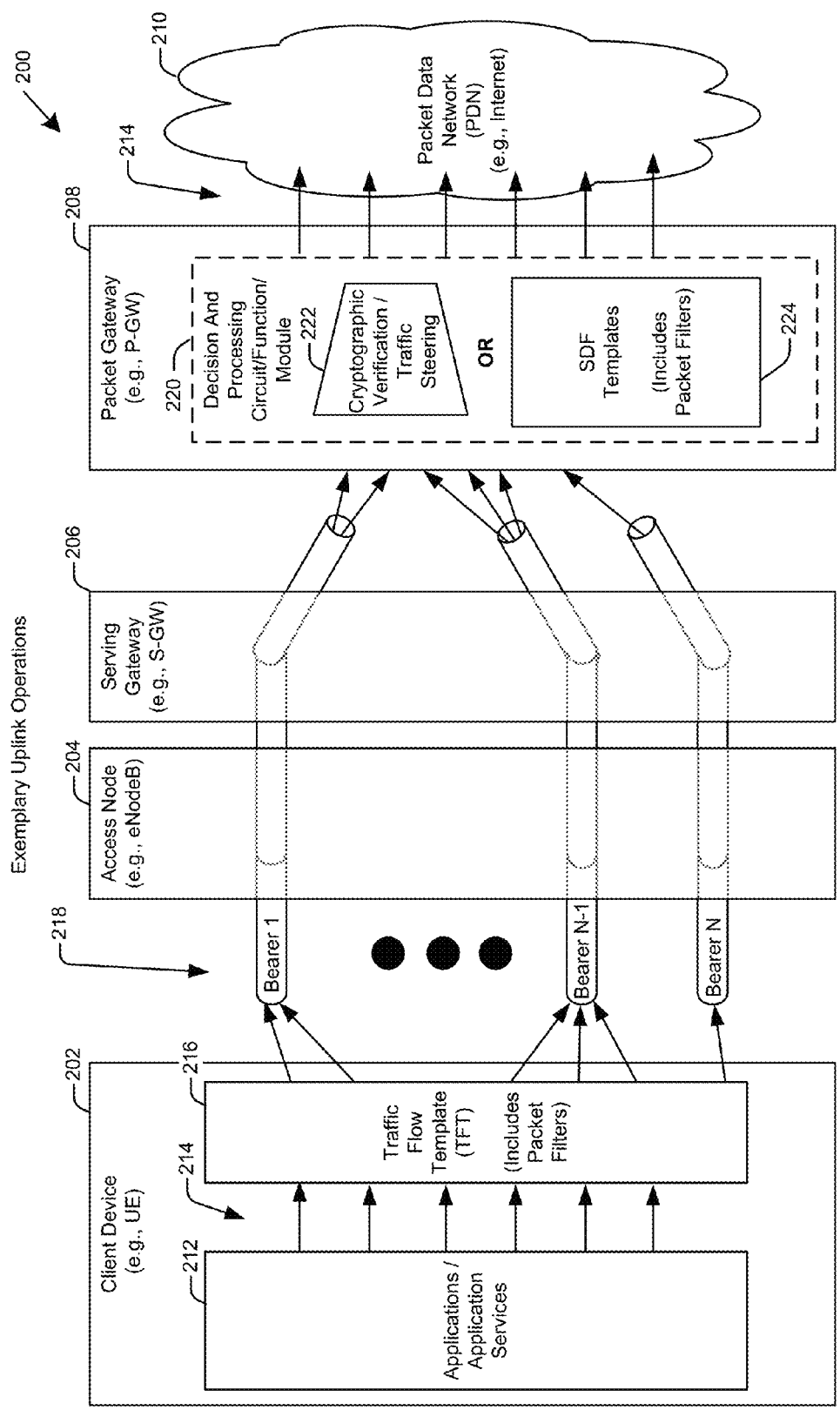
FIG. 2 illustrates an exemplary uplink operation.

FIG. 2 illustrates an exemplary uplink operation 200. The exemplary uplink operations 200 are presented in the context of a long term evolution (LTE) system for convenience. The example is not intended to place any limitation on the scope of any aspects described herein.

Represented in FIG. 2 are a client device 202 (e.g., user equipment, user device, terminal, mobile device), an access node 204 (e.g., eNodeB), a serving gateway (S-GW) 206, a packet gateway (P-GW) 208 and a packet data network (PDN) 210 (e.g., the Internet).

The exemplary uplink operations 200 of FIG. 2 are now described. IP flows 214 (e.g., from applications/application services 212 of the client device 202) are applied to packet filters (not shown) included with a traffic flow template (TFT) 216. The number of IP flows 214 depicted is illustrative and not intended to be limiting.

The packet filters of the TFT 216 filter the IP flows into bearers 218 (e.g., evolved packet system (EPS) bearers). Three bearers 218 (e.g., bearer 1, bearer N−1, and bearer N) are illustrated for demonstrative purposes. In one aspect, a bearer can be shared by multiple applications/application services. Each bearer may be associated with a unique set of parameters.

IP flows 214 can be mapped, for example, to a default bearer or to one or more dedicated bearers. The default bearer may typically have a non-guaranteed bit rate, while the dedicated bearers may typically have either guaranteed or non-guaranteed bit rates. The bearers may pass through the access node 204 and S-GW 206. Aspects of the access node 204 and S-GW 206 are not described herein and are known to those of ordinary skill in the art.

In one aspect, IP flows 214 from the bearers 218 may be passed to a decision and processing circuit/function/module 220. The decision and processing circuit/function/module 220 may cause UL packets received from the bearers 218 to be passed to a cryptographic-validation and traffic-steering circuit/function/module 222 or to service data flow (SDF) templates 224 and packet filters included therein (not shown).

UL packets having network tokens included therewith may be passed to the cryptographic-validation and traffic-steering circuit/function/module 222. Enforcement of one or more policies associated with a network token may be carried out upon successful validation of the network token.

UL packets that do not have network tokens included therewith may be passed to the SDF templates 224 by the decision and processing circuit/function/module 220. The use of the packet filters of the SDF templates 224 may require more processing and memory resources than does the use of the cryptographic-validation and traffic-steering circuit/function/module 222. To perform filtering using the packet filters of the SDF templates 224, for example, the P-GW 208 must maintain a separate table entry table for each SDF.

Accordingly, use of network tokens (and the consequent use of the cryptographic-validation and traffic-steering circuit/function/module 222) conserves resources and reduces latency. In one aspect, a cryptographic network token (e.g., a software token) may be used to supplement/enhance packet inspection. One advantage of this aspect includes scalability. That is, no table entries or states need to be kept on a fast-path (a.k.a., fast-pass). Another advantage of this aspect includes low latency. That is, a single cryptographic operation (e.g., hash or advanced encryption standard (AES), whichever may run faster or may be determined appropriate) may be sufficient for access control.

Still another advantage may include flexibility. That is, the cryptographic network token may be derived based on various meta data. Such meta data is not limited to the parameters being filtered in TFT/SDF templates. Additionally, various policies (e.g., authenticity policies and/or authorization of packet policies) may be applied to the network token. Still yet another advantage may include a resilience to distributed denial of service (DDoS) attacks. That is, any packet including an erroneous/improper/non-authentic cryptographic network token will be dropped before being sent to a server (e.g., server 124, 126, 128, 130 of FIG. 1) thereby preventing the flooding of the server with packets. Still yet another advantage may lie in a feature of relocatability. Realization of this advantage may be understood by defining/mapping a filtering rule (or set of rules) to a corresponding secret key at the first gateway, and then sharing the secret key with the second gateway. Thus, during a handover between the first and second gateways, the aspect permits a relocation of SDF filters via a transfer/sharing of the secret key. This eliminates a need to transfer all of the data related to the filtering rule (or set of rules) associated with a given SDF filter. The advantage of relocatability, therefore, frees processing resources, which may otherwise have been used to transfer all of the data, for other purposes.

Overview

One feature generally relates to a derivation by a device, such as a gateway device, of a network token. The network token may be referred to herein as a token, a network token, or a cryptographic network token. The network token may be based on a subscription profile reflecting a network policy associated with an application and a client device. In some aspects, the network token may be derived by the gateway device and may only be verified by the gateway device. The network token may be associated with a data flow between an application service and a client device (e.g., mobile device, user equipment, user device). The gateway device may provision the network token to the client device. The client device may include the network token in one or more data packets sent to the application service via the gateway device. The gateway device may verify the network token associated with each of the one or more packets and may use information associated with the network token to steer the packet to the application service. Two broad processes are exemplified herein in connection with exemplary aspects related to network tokens.

A first process relates to the "setup" of the network tokens. Setup may involve the derivation and provisioning of a network token via either signaling/messaging in the control plane (C-plane). Non-limiting examples of establishment of network tokens via signaling or messaging in the C-plane are provided below.

A second process relates to the use of, and enforcement of policies using, network tokens. Use and/or enforcement may involve including a network token in one or more UL packets, where inclusion of the network token in a packet may occur at, for example, a client device (e.g., client device 202, FIG. 2) and/or an access node (e.g., access node 204, FIG. 2). The token may be added to the packet or otherwise associated with it. Use and/or enforcement may additionally involve a network function of validation of the network token. The validation of the network token may take place, for example, at a P-GW (e.g., P-GW 208, FIG. 2). In some aspects, the P-GW that derived a network token sent to a client device will be the P-GW that validates the network token received from the client device. In other words, in some aspects the node (e.g., P-GW) that derives the token is the only node that can also validate the token. Validation would not necessarily involve any need for filtering. A single cryptographic operation (e.g., hash, AES) may be implemented. Memory lookup, required when using packet inspection with TFT/SDF templates, may not be necessary.

Presented herein are examples of methods and devices that make use of cryptographic network tokens to supplement, or as an alternative to, known methods of access/admission control in communication systems. A gateway (e.g., a P-GW) can use the cryptographic network tokens to filter unauthorized traffic without keeping flow states, i.e., stateless filter. Furthermore, a client device can use the cryptographic network token to associate one or more UL packets with an agreed upon data flow (e.g., bearer) and to steer the packets to an authorized destination. Other access control rules can be included in, or associated with, the network token.

Described herein are exemplary methods of setting up tokens for access/admission and traffic flow of packets in a packet data network (PDN). Following token set up, described herein are exemplary methods of enforcement of access/admission policies by verification of the network token. Basic cryptographic algorithms (e.g., hash, AES) may be used. In contrast to today's methods, no memory lookup is needed to enforce access/admission policies.

Data Flows

In the aspects described herein, IP flows, data flows, or flows, need not be limited to bearers as presented in the exemplary illustration of FIG. 2. A client device may operate or run one or more applications. Each client application may be mapped to an application service operating or running on an application server. A flow may therefore be defined based on the application operating in the device and on the application server. A flow may be defined as a path that packets take between the application running at the client device and the application service running at the application server. Although a flow may be associated with an application operating on the client device, the flow does not necessarily identify the client device. A network token may be used to identify one or more flows. Accordingly, a network token may be associated with multiple flows.

One flow may be mapped to multiple services running on the same server in a network. For example, a client device may use one service offered by one provider on a server. The server typically has one IP address. However, the service may host multiple applications on the server. The multiple applications may include, for example, a mapping application, an information search application, and a social networking application. The multiple applications therefore have the same destination IP address, so from the perspective of a gateway of a core network (e.g. a P-GW), the multiple applications can be considered as a single flow instead of multiple flows. Accordingly, a single flow can be mapped to multiple services.

A flow can be associated with multiple services. Also, a network token can be associated with multiple services where the services may be run by multiple application service providers. For example, a client device may have multiple sponsors (e.g., multiple service providers). In aspects described herein, a gateway may derive a network token that is associated with the multiple application service providers. Consequently, a single token may be mapped to one or more application services that are in turn associated with one or more flows.

In several examples provided herein, a network token may be derived based on an application identifier (App ID). Derivation of network tokens, however, is not limited to such examples. Other parameters, and combinations of parameters may be used to derive a network token. The App ID may be associated with one or more servers. For example, a given service provider may have different data centers (each with its own server) in different geographic locations. In such a case, the App ID would be associated with more than one sever. The token may beneficially uses the App ID instead of a server IP address. A gateway can verify that the packet, associated with a network token, is heading toward a server of a given service provider, even though the network token does not specify an IP address of the destination server.

Token Setup—Exemplary System Level Call Flows

The examples set forth herein may apply to an initial PDN connectivity request procedure (during which a default bearer may be set up) and to dedicated bearer setup procedures (during which one or more dedicated bearers may be set up).

Figure 3:
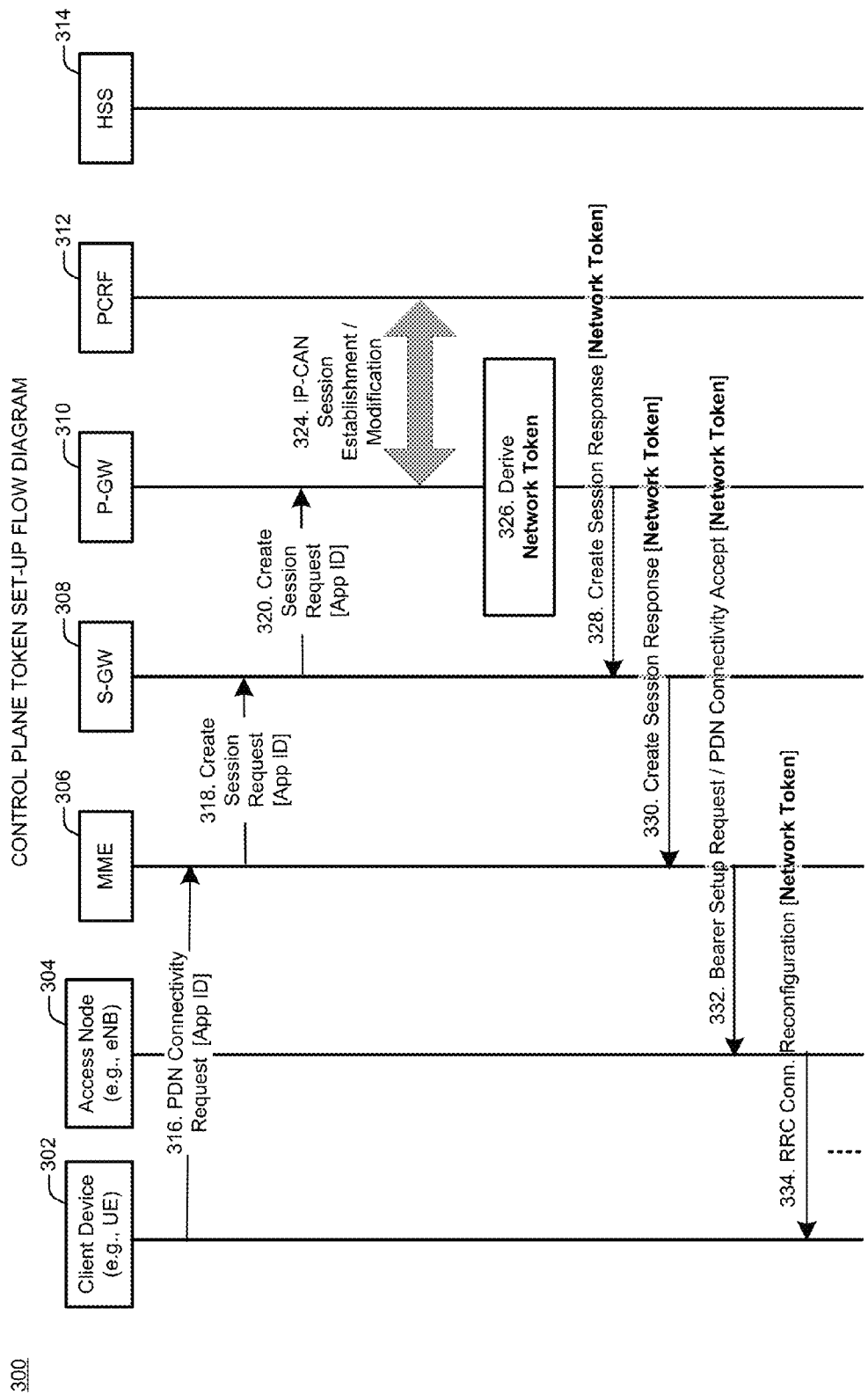
FIG. 3 is a diagram illustrating an exemplary call flow where a network token may be issued to a client device by a P-GW.

FIG. 3 is a diagram illustrating an exemplary call flow 300 where a network token may be issued to a client device 302 by a P-GW 310. The call flow may be implemented in the C-plane. An access node 304 (e.g., an eNodeB) may be an agnostic. That is, the access node 304 may not know that a client device 302 has sent a request for a network token to the P-GW 310. The request, and exchange of network tokens, may be transparent to an agnostic access node 304. FIG. 3 includes representations of the client device 302, an access node 304, an MME 306, an S-GW 308, the P-GW 310, a policy and charging rules function (PCRF) 312 server, and a home subscriber server (HSS) 314.

In the exemplary call flow 300 of FIG. 3, a client device 302 may take steps to establish a connection in general, or establish a connection with a service. In one aspect, the client device 302 may send 316 a PDN connectivity request to an MME 306. A request for a network token may be implicitly recognized in connection with actions taken by the client device 302 to establish the connection. For example, a request for a network token may be implicitly recognized in connection with the PDN connectivity request of the client device 302. Alternatively, the request for the network token may be explicitly included in the connection request sent from the client device. For example, a request for a network token may be explicitly included with the PDN connectivity request. The request for the network token may include an application identifier (App ID). As yet another alternative, the client device 302 may not request the network token, but the network token may be assigned in the C-plane. For example, another node, or some policy, may require the use of network tokens. In such an alternative aspect, even though the client device 302 does not request the network token, a network token may nevertheless be provisioned to the client device in the control-plane.

In response to receipt of the PDN connectivity request, the MME may send 318 a create session request to the S-GW 308. The request for the network token may be copied to or otherwise included with the create session request. The request for the network token may also include the application identifier (App ID).

In response to receipt of the create session request, the S-GW 308 may send 320 a create session request to the P-GW 310. The request for the network token may be copied to or otherwise included with the create session request. The request for the network token may also include the application identifier (App ID).

In response to receipt of the create session request, the P-GW 310 may perform 324 steps for establishment/modification for an IP connectivity access network (IP-CAN). As known to those of skill in the art, an IP-CAN is an access network that provides Internet protocol (IP) connectivity. The term may be applicable to cellular networks (e.g., 3GPP networks) as well as wireless local area networks (WLAN) (e.g., WiFi, HotSpot, etc.).

Also, in response to receipt of the request for the network token, the P-GW 310 may obtain or derive 326 the network token. As used herein, the term "derive" may mean deriving locally or obtaining from another device. A network token may be a hash of input parameters associated with a packet. In one aspect, a network token may be validated at a P-GW 310 by recreating a token using the input parameters of the packet and then comparing the recreated token with the token included with the packet. A secret key known to the P-GW 310 may be used in a cryptographic function to derive the network token. In one example, the P-GW 310 may derive the network token in view of an application access policy retrieved from an application function (AF). In one aspect, the access policy may associate a flow to an application. The network token may further be derived in view of the App ID, e.g., if the App ID is included with the request for the network token. In some aspects, the network token may include encrypted information. Decryption may be accomplished using a cryptographic function having as its input, in one example, a secret key known to the P-GW 310. By way of example, successful decryption of the network token may yield a value that may indicate, in association with the UL packet that included the network token, a destination address of a server and/or application service and/or a source address of a client device and/or an access node from which the UL packet was sourced. In one aspect, the ability to obtain, for example, destination address of a server and/or application service from a network token may mean that the packet associated with the token is authorized to be sent to that destination and may further mean that the SDF templates 224 (and their associated packet filters) are not needed. Packet inspection may thus be avoided. The P-GW 310 may issue the network token to the client device 302 as follows.

The P-GW 310 may send 328 a create session response to the S-GW 308. The P-GW 310 may include the network token in the create session response sent to the S-GW 308. In response to the create session response, the S-GW 308 may send 330 a create session response to the MME 306. The S-GW 308 may include the network token in the create session response sent to the MME 306. In response to the create session response, the MME 306 may send 332 a bearer setup request/PDN connectivity accept to the access node 304. The MME 306 may include the network token in the bearer setup request/PDN connectivity accept sent to the access node 304. In response to the bearer setup request/PDN connectivity accept the access node 304 may send 334 an RRC connection reconfiguration to the client device. The access node 304 may include the network token in the RRC connection reconfiguration sent to the client device. The client device 302 may receive the network token included with the RRC connection reconfiguration received from the access node 304.

Once the client device 302 has the network token, the client device 302 may include the network token with one or more UL packets constructed for data transmission to the application service.

Figure 4:
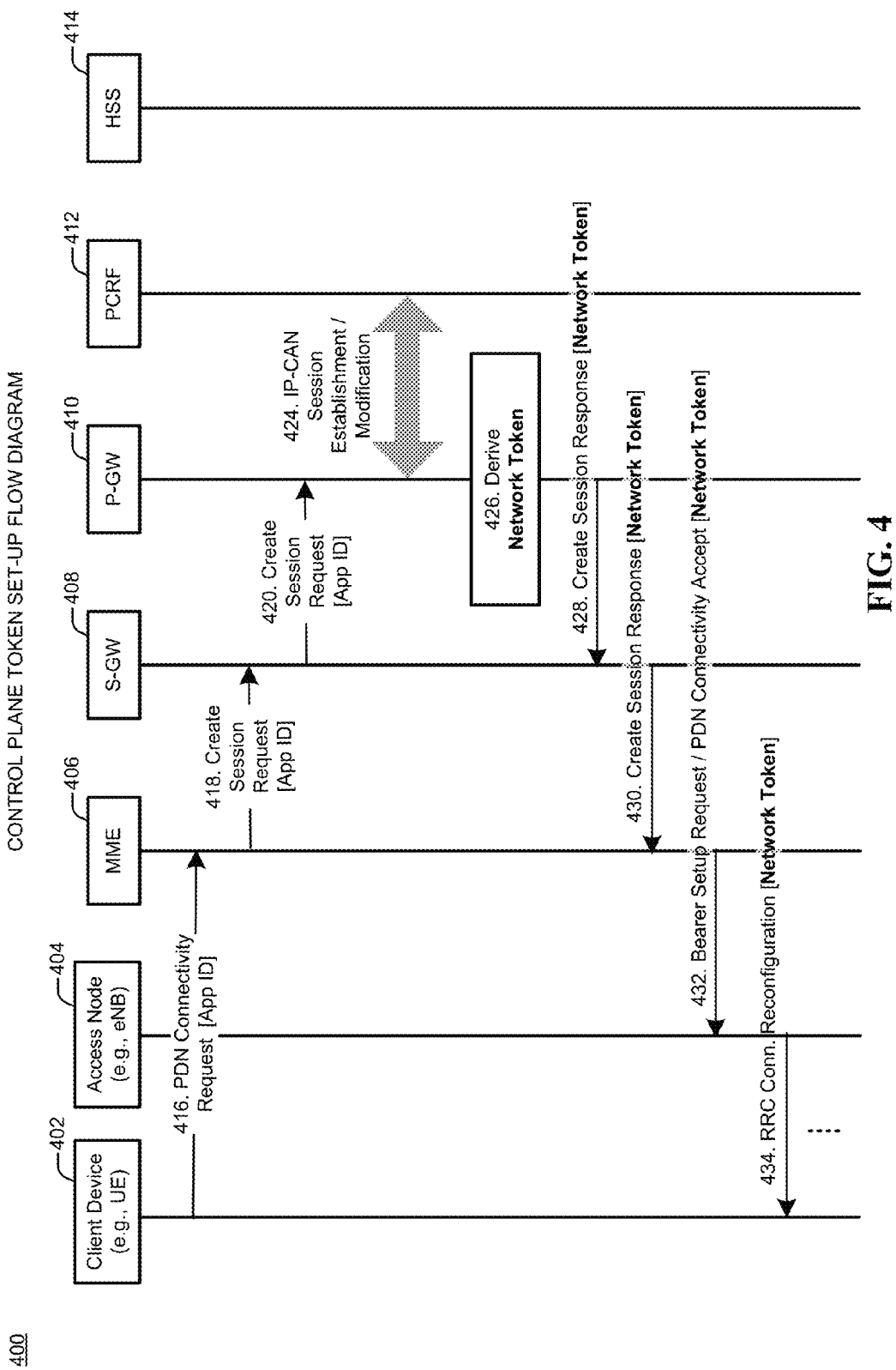
FIG. 4 is a diagram illustrating an exemplary call flow where a network token may be issued to an access node (e.g., eNodeB) by a P-GW.

FIG. 4 is a diagram illustrating an exemplary call flow 400 where a network token may be issued to an access node (e.g., eNodeB) 404 by a P-GW 410; the client device 402 may not receive the network token. Here, the client device 402 may be considered an agnostic. That is, according to this example, the client device 402 may not be the entity that includes the network token in one or more UL packets intended for an application service. The call flow may be implemented in the C-plane. FIG. 4 includes representations of a client device 402, an access node 404, an MME 406, an S-GW 408, the P-GW 410, a PCRF 412, and an HSS 414.

In the exemplary call flow of FIG. 4, a client device 402 may take steps to establish a connection in general, or establish a connection with a service. In one aspect, the client device 402 may send 416 a PDN connectivity request to an MME 406. A request for a network token may be implicitly recognized in connection with actions taken by the client device 402 to establish the connection. For example, a request for a network token may be implicitly recognized in connection with the PDN connectivity request of the client device 402. Alternatively, the request for a network token may be explicitly included in the connection request of the client device 402. For example, a request for a network token may be explicitly included with the PDN connectivity request. The request for the network token may include an application identifier (App ID). As yet another alternative, the client device 402 may not request the network token, but the network token may be assigned in the C-plane.

In response to receipt of the PDN connectivity request, the MME 406 may send 418 a create session request to the S-GW 408. The request for the network token may be copied to or otherwise included with the create session request. The request for the network token may include the application identifier (App ID).

In response to receipt of the create session request, the S-GW 408 may send 420 a create session request to the P-GW 410. The request for the network token may be copied to or otherwise included with the create session request. The request for the network token may include the application identifier (App ID).

In response to receipt of the create session request, the P-GW 410 may perform 424 steps for establishment/modification for an IP-CAN session. Also, in response to receipt of the request for the network token, the P-GW 410 may derive 426 the network token. A secret key known to the P-GW 410 may be used in a cryptographic function to derive the network token. In one example, the P-GW 410 may derive the network token in view of an application access policy retrieved from an application function (AF). In one aspect, the access policy may associate a flow to an application. The network token may further be derived in view of the App ID, e.g., if the App ID is included with the request for the network token. The P-GW 410 may issue the network token to the access node 404 as follows.

The P-GW 410 may send 428 a create session response to the S-GW 408. The P-GW 410 may include the network token in the create session response sent to the S-GW 408. In response to the create session response, the S-GW 408 may send 430 a create session response to the MME 406. The S-GW 408 may include the network token in the create session response sent to the MME 406. In response to the create session response, the MME 406 may send 432 a bearer setup request/PDN connectivity accept to the access node 404. The MME 406 may include the network token in the bearer setup request/PDN connectivity accept sent to the access node 404. In this exemplary manner, the access node 404 may obtain the network token from the P-GW 410.

The call flow may continue. For example, in response to the bearer setup request/PDN connectivity accept the access node 404 may send 434 an RRC connection reconfiguration to the client device 402. In this second example, the access node 404 may not include the network token in the RRC connection reconfiguration to the client device 402.

Once the access node 404 has the network token, the access node 404 may include the network token with each UL packet constructed for data transmission to the application service.

Figure 5:
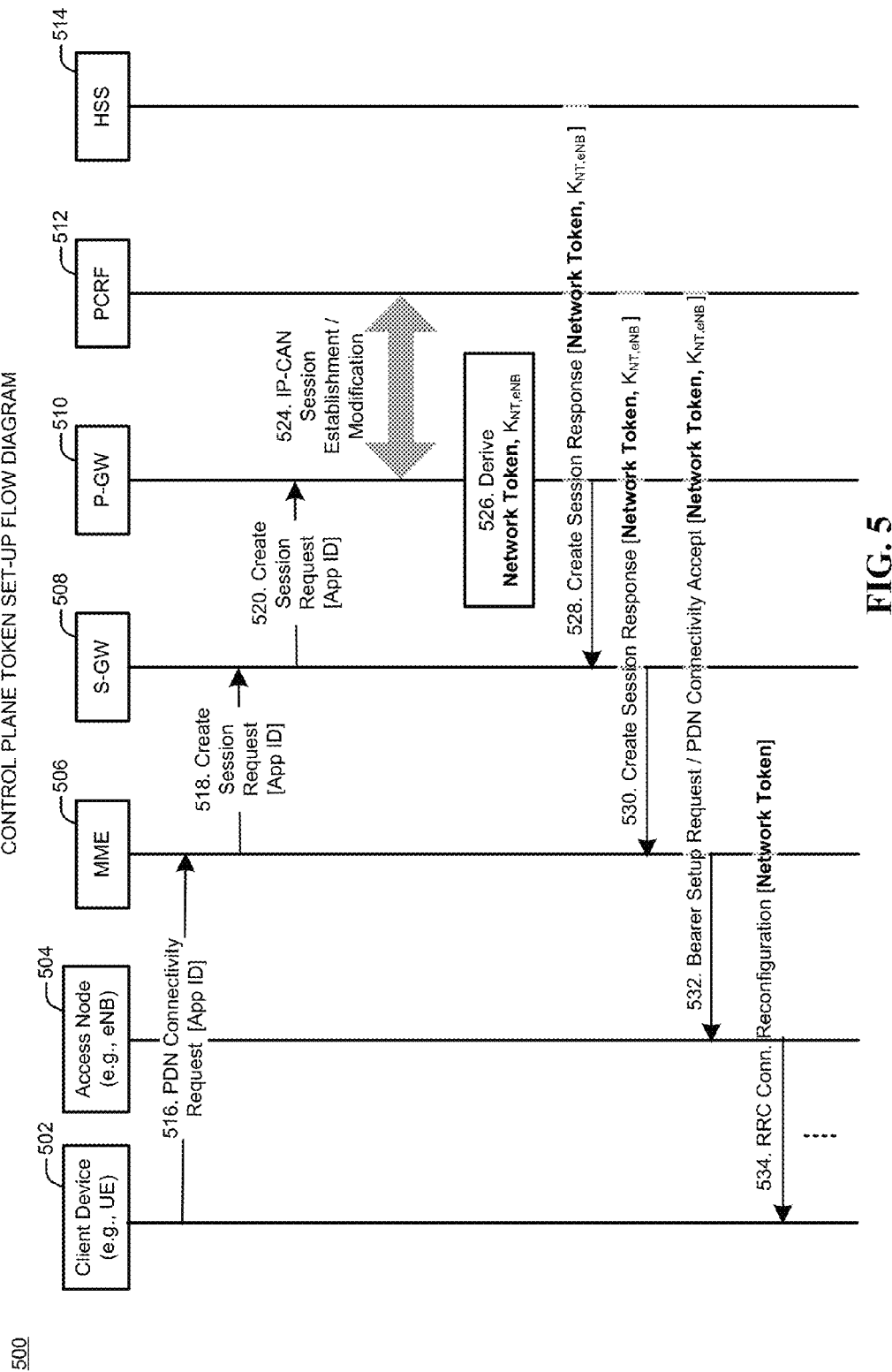
FIG. 5 is a diagram illustrating an exemplary call flow where a P-GW may issue a network token to a client device and may also issue a secret key specific to an access node to the access node.

FIG. 5 is a diagram illustrating an exemplary call flow 500 where a P-GW 510 may issue a network token to a client device 502 and may also issue a secret key specific to an access node 504 to the access node 504. The secret key specific to the access node 504 may be a function of a secret key held by the P-GW 510 and, for example, an identifier of the access node 504. Exercise of this third exemplary call flow 500 may permit the access node 504 to verify network tokens included with one or more UL packets received from the client device 502, before forwarding the UL packets (with their included network tokens) to the core network. This may facilitate a "first-mile filtering" operation, where, during use/enforcement processes (to be described later herein) the access node 504 may be empowered to verify an UL packet based on a cryptographic function relating to the received network token and the secret key specific to the access node 504. This may enable a "trusted" access node 504 to discard unauthorized UL packets received from a client device 502 before the packets are sent to the core network. The call flow may be implemented in the C-plane. FIG. 5 includes representations of the client device 502, the access node 504, an MME 506, an S-GW 508, the P-GW 510, a PCRF 512, and an HSS 514.

In the exemplary call flow 500 of FIG. 5, a client device 502 may take steps to establish a connection in general, or establish a connection with a service. In one aspect, the client device 502 may send 516 a PDN connectivity request to an MME 506. A request for a network token may be implicitly recognized in connection with actions taken by the client device 502 to establish the connection. For example, a request for a network token may be implicitly recognized in connection with a PDN connectivity request of the client device 502. Alternatively, the request for a network token may be explicitly included in a connection request sent from the client device 502. For example, a request for a network token may be explicitly included with the PDN connectivity request. The request for the network token may include an application identifier (App ID). As yet another alternative, the client device 502 may not request the network token, but the network token may be assigned in the C-plane.

In response to receipt of the PDN connectivity request, the MME 506 may send 518 a create session request to the S-GW 508. The request for the network token may be copied to or otherwise included with the create session request. The request for the network token may also include the application identifier (App ID).

In response to receipt of the create session request, the S-GW 508 may send 520 a create session request to the P-GW 510. The request for the network token may be copied to or otherwise included with the create session request. The request for the network token may also include the application identifier (App ID).

In response to receipt of the create session request, the P-GW 510 may perform 524 steps for establishment/modification for an IP-CAN session (item 4). Also, in response to receipt of the request for the network token, the P-GW 510 may derive 526 the network token. A secret key specific to an access node 504 that is derived by the P-GW 510 may be used in a cryptographic function to derive the network token. The P-GW 510 may derive a secret key specific to the access node 504 for each access node 504 by deriving that secret key ($K_{NT,\ eNB}$) from a secret key ($K_{NT}$) known to the P-GW 510. For example, the secret key specific to an access node 504 may be derived using a key derivation function (KDF) that may be a function of, for example, $K_{NT}$ and an access node identifier (e.g., "eNB ID") (i.e., $K_{NT,\ eNB} = KDF(K_{NT}, \text{eNB ID})$). In this way, each derived network token may be associated with (e.g., bound to) a specific access node 504. In one example, the P-GW 510 may derive the network token in view of an application access policy retrieved from an application function (AF). In one aspect, the access policy may associate a flow to an application. The network token may further be derived in view of the App ID, if the App ID is included with the request for the network token. The P-GW 510 may issue the network token to the client device 502, and may issue the secret key specific to the access node ($K_{NT,\ eNB}$) to the access node 504, as follows.

The P-GW 510 may send 528 a create session response to the S-GW 508. The P-GW 510 may include the network token and the secret key $K_{NT,\ eNB}$ in the create session response sent to the S-GW 508. In response to the create session response, the S-GW 508 may send 530 a create session response to the MME 506. The S-GW 508 may include the network token and the secret key $K_{NT,\ eNB}$ in the create session response sent to the MME 506. In response to the create session response, the MMF 506 may send 532 a bearer setup request/PDN connectivity accept to the access node 504. The MME 506 may include the network token and the secret key $K_{NT,\ eNB}$ in the bearer setup request/PDN connectivity accept sent to the access node 504. Accordingly, the access node 504 has now obtained the secret key $K_{NT,\ eNB}$. In response to the bearer setup request/PDN connectivity accept the access node 504 may send 534 an RRC connection reconfiguration to the client device 502. The access node 504 may include the network token in the RRC connection reconfiguration to the client device 502.

The client device 502 may receive the network token included with the RRC connection reconfiguration received from the access node 504. Accordingly, the client device 502 has now obtained the network token.

Once the client device 502 has the network token, the client device 502 may include the network token with one or more UL packets constructed for data transmission to the application service.

Figure 6:
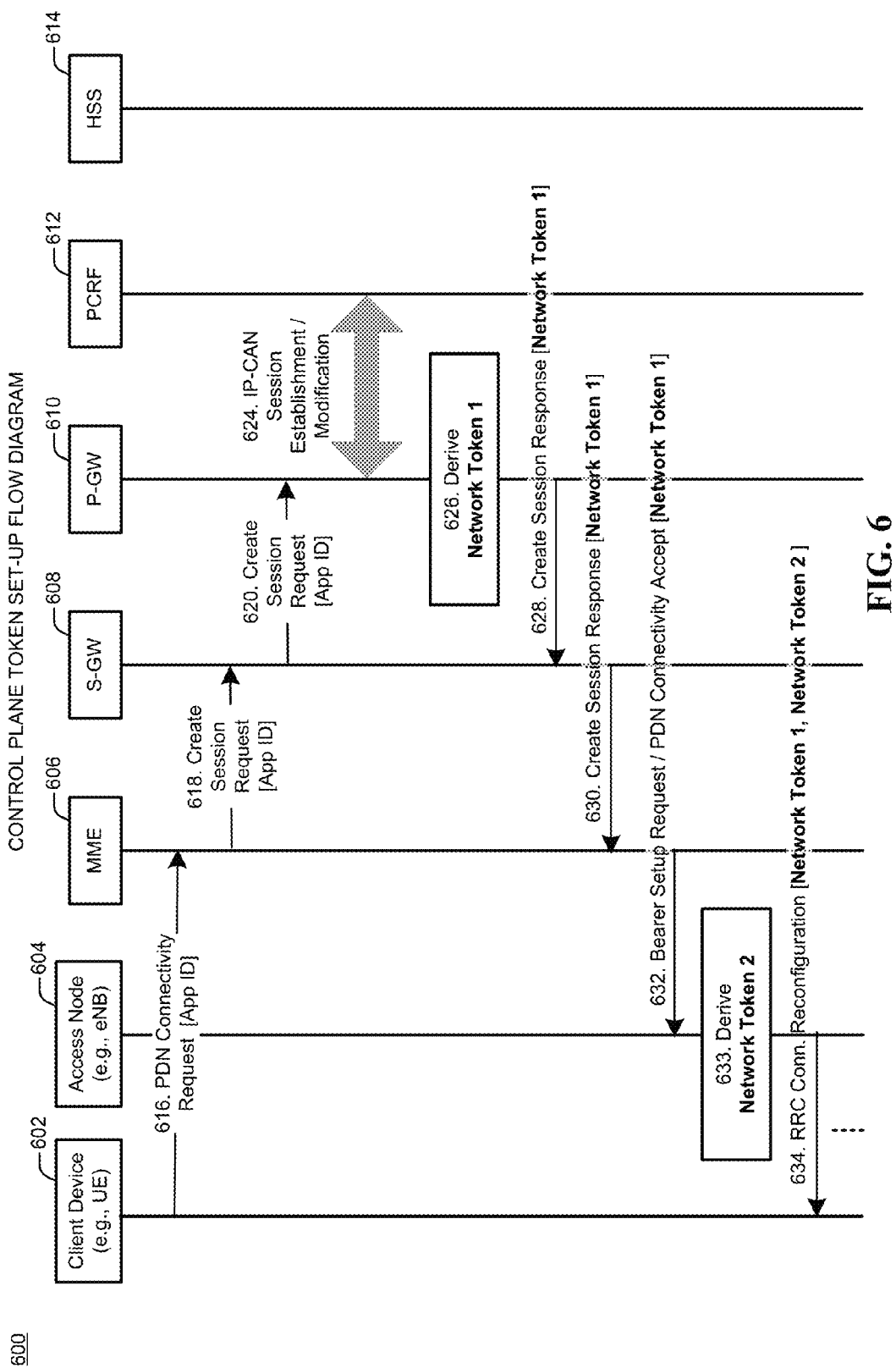
FIG. 6 is a diagram illustrating an exemplary call flow where a first network token (e.g., network token 1) may be issued to a client device by a P-GW and a second network token (e.g., network token 2), different from the first, may be issued to the client device by an access node associated with the client device.

FIG. 6 is a diagram illustrating an exemplary call flow 600 where a first network token (e.g., network token 1) may be issued to a client device 602 by a P-GW 610 and a second network token (e.g., network token 2), different from the first, may be issued to the client device 602 by an access node 604 associated with the client device 602. This example may not involve sharing of secret keys. That is, the first network token may be derived with a first secret key, which is known only to the P-GW 610, while the second network token may be derived with a second secret key that is known to the access node 604, where the first and second secret keys are different. This example may be useful, for example, in circumstances under which a trust assumption between the access node 604 and the P-GW 610 is less than desired or is absent. The exemplary call flow 600 may be implemented in the C-plane. FIG. 6 includes representations of the client device 602, the access node 604, an MME 606, an S-GW 608, the P-GW 610, a PCRF 612, and an HSS 614.

In the exemplary call flow 600 of FIG. 6, a client device 602 may take steps to establish a connection in general, or establish a connection with a service. In one aspect, the client device 602 may send 616 a PDN connectivity request to an MME 606. A request for a network token may be implicitly recognized in connection with actions taken by the client device 602 to establish the connection. For example, a request for a network token may be implicitly recognized in connection with a PDN connectivity request of a client device 602. Alternatively, the request for a network token may be explicitly included in a connection request of a client device 602. For example, a request for a network token may be explicitly included with the PDN connectivity request. The request for the network token may include an application identifier (App ID). As yet another alternative, the client device 602 may not request the network token, but the network token may be assigned in the C-plane.

In response to receipt of the PDN connectivity request, the MME 606 may send 618 a create session request to the S-GW 608. The request for the network token may be copied to or otherwise included with the create session request. The request for the network token may also include the application identifier (App ID).

In response to receipt of the create session request, the S-GW 608 may send 620 a create session request to the P-GW 610. The request for the network token may be copied to or otherwise included with the create session request. The request for the network token may also include the application identifier (App ID).

In response to receipt of the create session request, the P-GW 610 may perform 624 steps for establishment/modification for an IP-CAN session. Also, in response to receipt of the request for the network token, the P-GW 610 may derive 626 a first network token (e.g., network token 1). A secret key known to the P-GW 610 may be used in a cryptographic function to derive the network token. In one example, the P-GW 610 may derive the network token in view of an application access policy retrieved from an application function (AF). In one aspect, the access policy may associate a flow to an application. The network token may further be derived in view of the App ID, if the App ID is included with the request for the network token. The P-GW 610 may issue the network token to the client device 602 as follows.

The P-GW 610 may send 628 a create session response to the S-GW 608. The P-GW 610 may include the network token in the create session response sent to the S-GW 608. In response to the create session response, the S-GW 608 may send 630 a create session response to the MME 606. The S-GW 608 may include the network token in the create session response sent to the MME 606. In response to the create session response, the MME 606 may send 632 a bearer setup request/PDN connectivity accept to the access node 604. The MME 606 may include the network token in the bearer setup request/PDN connectivity accept sent to the access node 604.

In response to the bearer setup request/PDN connectivity accept the access node 604 may derive 633 a second network token (e.g., network token 2). A secret key known to the access node 604 may be used in a cryptographic function to derive the second network token. In one example, the access node 604 may derive the second network token in view of an application access policy retrieved from an application function (AF). In one aspect, the access policy may associate a flow to an application. The second network token may further be derived in view of the App ID, if the App ID is included with the request for the network token.

Also in response to the bearer setup request/PDN connectivity accept the access node 604 may send 634 an RRC connection reconfiguration to the client device 602. The access node 604 may include the first network token derived at the P-GW 610 and additionally may include the second network token derived at the access node 604 in the RRC connection reconfiguration sent to the client device 602. Thus, the client device 602 may receive both the first network token derived at the P-GW 610 and the second network token derived at the access node 604 in the RRC connection reconfiguration received from the access node 604.

Once the client device 602 has both the first network token derived at the P-GW 610 and the second network token derived at the access node 604, the client device 602 may include both the first network token derived at the P-GW 610 and the second network token derived at the access node 604 with UL packets constructed for data transmission to the application service.

Figure 7:
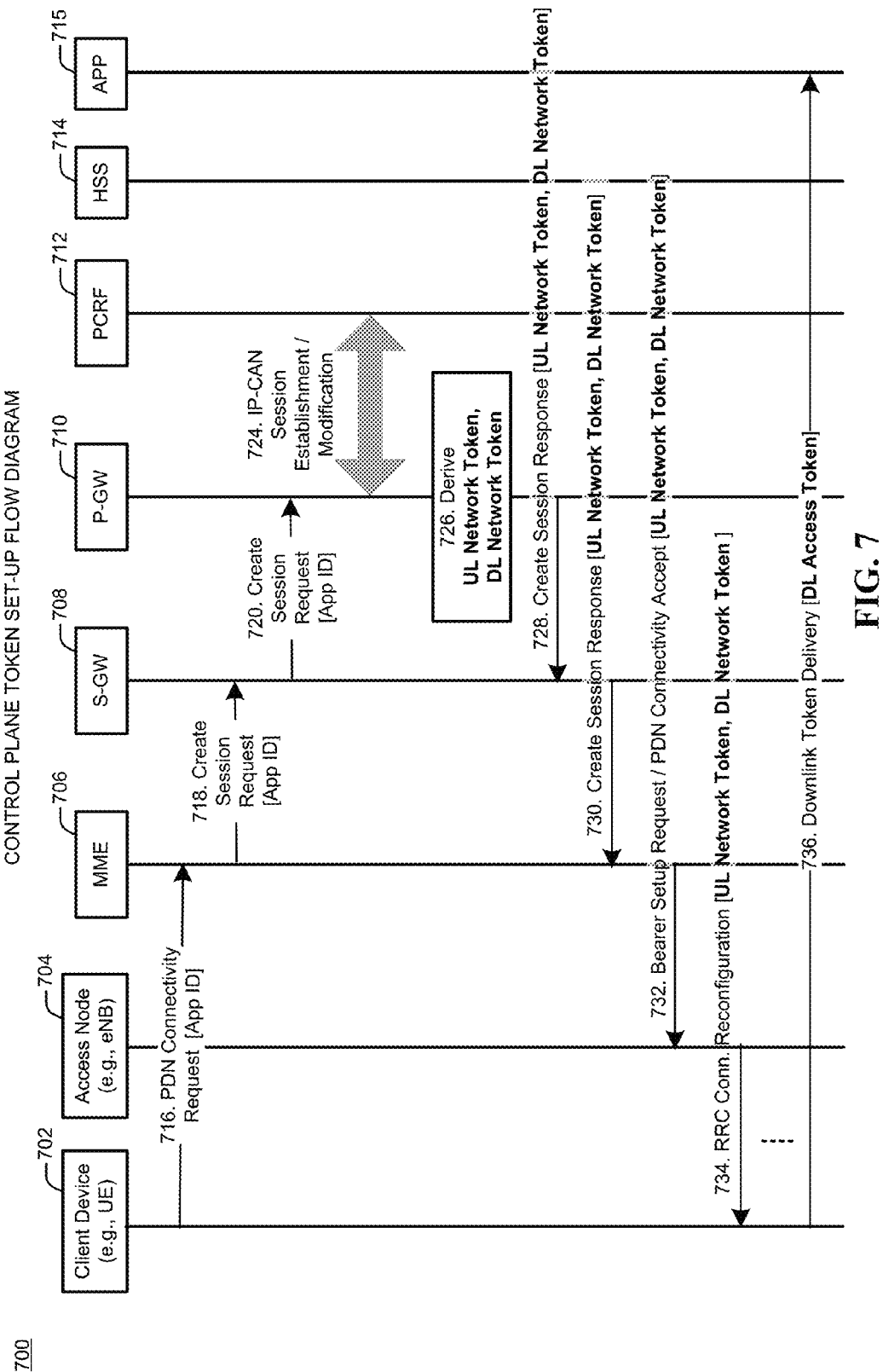
FIG. 7 is a diagram illustrating an exemplary call flow where two network tokens (e.g., an uplink network token and a downlink network token) may be issued to a client device by a P-GW.

FIG. 7 is a diagram illustrating an exemplary call flow 700 where two network tokens (e.g., UL network token and downlink (DL) network token) may be issued to a client device 702 by a P-GW 710. This exemplary call flow may be useful in connection with the use of downlink (DL) tokens for prioritization and filtering.

In one aspect, the client device 702 may include the UL network token with packets destined for a given application/application service/application server in a PDN. In one aspect the client device 702 may expect to receive the DL network token in packets received from the given application/application service/application server in the PDN. The client device 702 may send 736 the DL network token to the application (APP) 715 in the PDN, at which point the APP 715 in the PDN may be expected to include a copy of the DL network token in one or more packets it sends to the client device 702.

The exemplary call flow 700 may be implemented in the C-plane. FIG. 7 includes representations of the client device 702, the access node 704, an MME 706, an S-GW 708, the P-GW 710, a PCRF 712, an HSS 714, and an application/application service/application server (APP) 716 in the PDN.

In the exemplary call flow 700 of FIG. 7, a client device 702 may take steps to establish a connection in general, or establish a connection with a service. In one aspect, the client device 702 may send 7016 a PDN connectivity request to an MME 706. A request for a network token may be implicitly recognized in connection with actions taken by the client device 702 to establish the connection. For example, a request for a network token may be implicitly recognized in connection with a PDN connectivity request of a client device 702. Alternatively, the request for a network token may be explicitly included in a connection request of a client device 702. For example, a request for a network token may be explicitly included with the PDN connectivity request. The request for the network token may include an application identifier (App ID). As yet another alternative, the client device 702 may not request the network token, but the network token may be assigned in the C-plane.

In response to receipt of the PDN connectivity request, the MME 706 may send 718 a create session request to the S-GW 708. The request for the network token may be copied to or otherwise included with the create session request. The request for the network token may also include the application identifier (App ID).

In response to receipt of the create session request, the S-GW 708 may send 720 a create session request to the P-GW 710. The request for the network token may be copied to or otherwise included with the create session request. The request for the network token may also include the application identifier (App ID).

In response to receipt of the create session request, the P-GW 710 may perform 724 steps for establishment/modification for an IP-CAN session. Also, in response to receipt of the request for the network token, the P-GW 710 may derive 726 the UL network token and in some aspects may derive a downlink (DL) network token. A secret key known to the P-GW 710 may be used in a cryptographic function to derive the UL network token. In one example, the P-GW 710 may derive the UL network token in view of an application access policy retrieved from an application function (AF). In one aspect, the access policy may associate a flow to an application. The UL network token may further be derived in view of the App ID, if the App ID is included with the request for the UI, network token. Derivation of the DL network token may be based on the key known to the P-GW 710 and on a parameter associated with an application server. The P-GW 710 may issue the UL network token and, in some aspects, the DL network token to the client device 702 as follows.

The P-GW 710 may send 728 a create session response to the S-GW 708. The P-GW 710 may include the UL network token in the create session response sent to the S-GW 708. The P-GW 710 may also include the DL network token in the create session response sent to the S-GW 708. In response to the create session response, the S-GW 708 may send 730 a create session response to the MME 706. The S-GW 708 may include the UL network token and the DL network token in the create session response sent to the MME 706. In response to the create session response, the MME 706 may send 732 a bearer setup request/PDN connectivity accept to the access node 704. The MME 706 may include the UL network token and the DL network token in the bearer setup request/PDN connectivity accept sent to the access node 704.

In response to the bearer setup request/PDN connectivity accept the access node 704 may send an RRC connection reconfiguration to the client device 702. The access node 704 may include the UL network token and the DL network token with the RRC connection reconfiguration sent to the client device 702. Thus, the client device 702 may receive both the UL network token and the DL network token, both may have been derived at the P-GW 710 and delivered to the client device 702 in the RRC connection reconfiguration received from the access node 704.

In some aspects, the client device 702 may send 736 the DL network token to the APP 715 on the PDN. The APP 715 may then include the DL network token with one or more downlink packets sent from the APP 715 to the P-GW 710 in the downlink. In this aspect, the P-GW 710 may be able to more efficiently direct IP flows in the downlink direction as well as in the uplink direction. Because the original DL network token was derived by the P-GW 710, the P-GW 710 may be able to validate the DL network token received with packets from the APP 715. This may be a useful alternative to downlink packet inspection using TFT/SDF.

Token Use/Enforcement—Exemplary System Level Protocol Stacks

The aspects of use and enforcement in connection with the network tokens described above will now be presented.

Use of the network tokens may be described with respect to the movement of the network tokens among user-plane protocol stacks of a client device, an access node, a gateway, and an application server. Illustrated herein are six figures illustrating exemplary sets of user-plane protocol stacks. Each figure is different from the next in its depiction of network token movement among the protocol stacks. Many of the layers represented in the protocol stacks, and the interconnections among the layers, are well known. These layers will be described briefly with respect to the illustration of FIG. 8. Their descriptions will not be repeated for each exemplary figure to avoid repetition and improve conciseness of the application. Four of the figures include a shim layer, which may be considered as a layer utilized for the movement of network tokens in connection with the respective aspects illustrated by the four figures.

Figure 8:
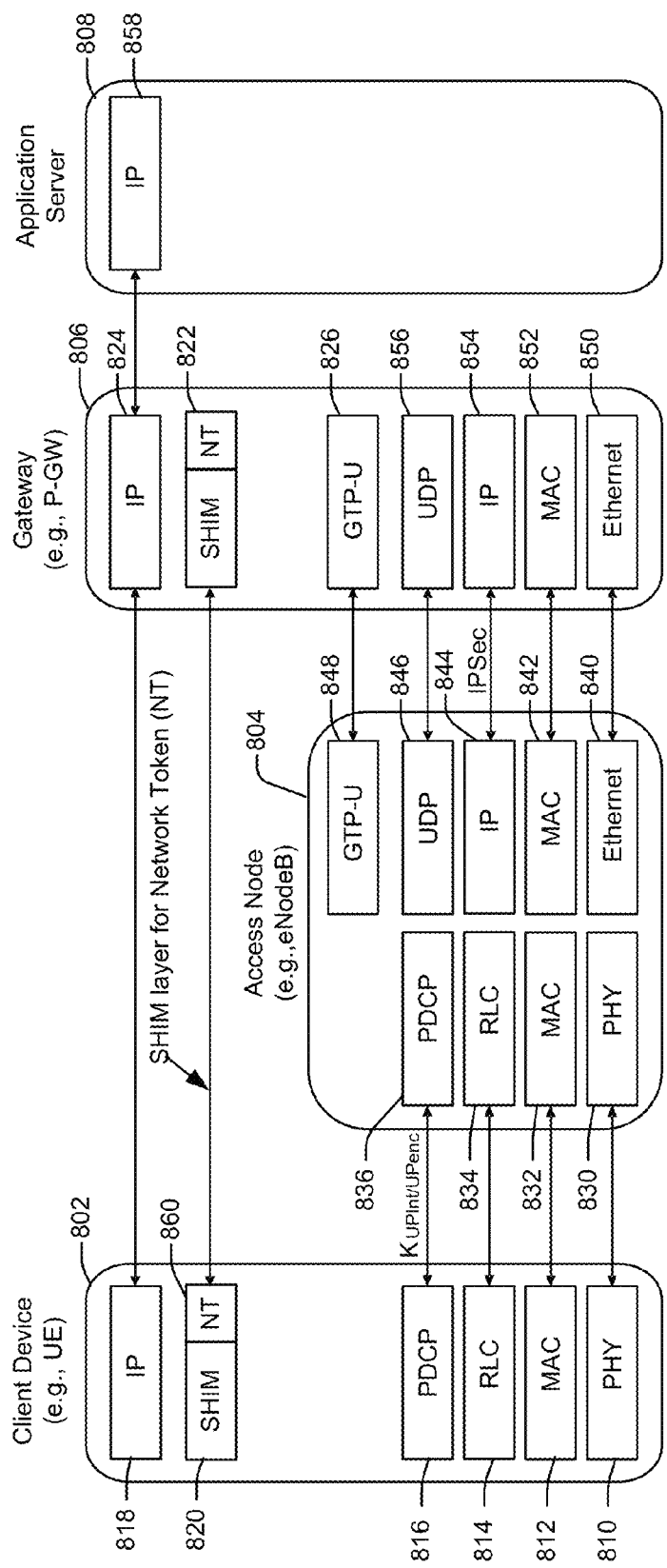
FIG. 8 is an exemplary illustration of user-plane protocol stacks of a system in accordance with one aspect described herein.

FIG. 8 is an exemplary illustration of user-plane protocol stacks 800 of a system in accordance with one aspect described herein. FIG. 8 depicts a client device 802, an access node 804, a gateway 806, and an application server 808. In the exemplary illustration FIG. 8, a protocol stack of the client device 802 may include, from lowest layer upward, a physical (PHY) layer 810, a medium access control (MAC) layer 812, a radio link control (RLC) layer 814, a packet data convergence protocol (PDCP) layer 816, and an Internet protocol (IP) layer 818. In one aspect, a network token could be carried in an IP extension header defined in Internet protocol (IP) version 6 (IPv6).

In one aspect, a shim layer 820 may be added to the user-plane protocol stack of a client device 802 and a corresponding shim layer 822 may be added the protocol stack of the gateway 806. Shim layer 820 and corresponding shim layer 822 facilitate movement of network tokens from the client device 802 to the gateway 806 in accordance with aspects described herein. In one aspect, the shim layer 820 lies below the IP layer 818 and above the MAC layer 812 of the client device 802. In this aspect, corresponding shim layer 822 lies below the IP layer 824 and above the GTP-U layer 826 of the gateway 806.

The aspect illustrated by FIG. 8 may be useful for movement of a network token 860 from the client device 802 to the gateway 806 without a need for any processing by the access node 804. Alternative methods are acceptable. By way of example, the client device 802 may receive a network token from the gateway 806 via a control-plane signaling/message set-up method described above (not illustrated in FIG. 8). In accordance with one aspect of the use of the network token, the client device 802 may include the network token in packets destined for the application server 808. The network token 860 may be carried in a shim header of the shim layer 820 to the gateway 806 as shown in FIG. 8. The network token 860 may be carried in the shim header separate from an IP header.

If verification of the network token (described below) at the gateway 806 is successful, the gateway 806 may forward the packet to the application server 808 after discarding the network token. If verification of the network token 860 at the gateway 806 is not successful, the gateway 806 may discard the packet and network token. In accordance with the illustrated aspect, no change would be needed at the application server 808 to support network token based application access.

For completeness of the description, the layers of the user-plane protocol stacks of the access node 804, gateway 806, and application server 808 will now be briefly described. In the exemplary illustration of FIG. 8, a protocol stack of the access node 804 may include, from lowest layer upward, a physical (PHY) layer 830, a medium access control (MAC) layer 832, a radio link control (RLC) layer 834, and a packet data convergence protocol (PDCP) layer 836, which respectively join with like named layers (1210, 812, 814, and 816) of the client device 802. In the exemplary illustration of FIG. 8, a protocol stack of the access node 804 may additionally include, from lowest layer upward, an Ethernet layer 840, a MAC layer 842, an IP layer 844, a user datagram protocol (UDP) layer 846, and a GTP-U layer 848. These respective layers join with like named layers (1250, 852, 854, 856, and 826) of the gateway 806. In the exemplary illustration of FIG. 8, the client device IP layer 818 joins the IP layer 824 of the gateway 806, while the IP layer 824 of the gateway 806 joins the IP layer 858 of the application server 808.

Figure 9:
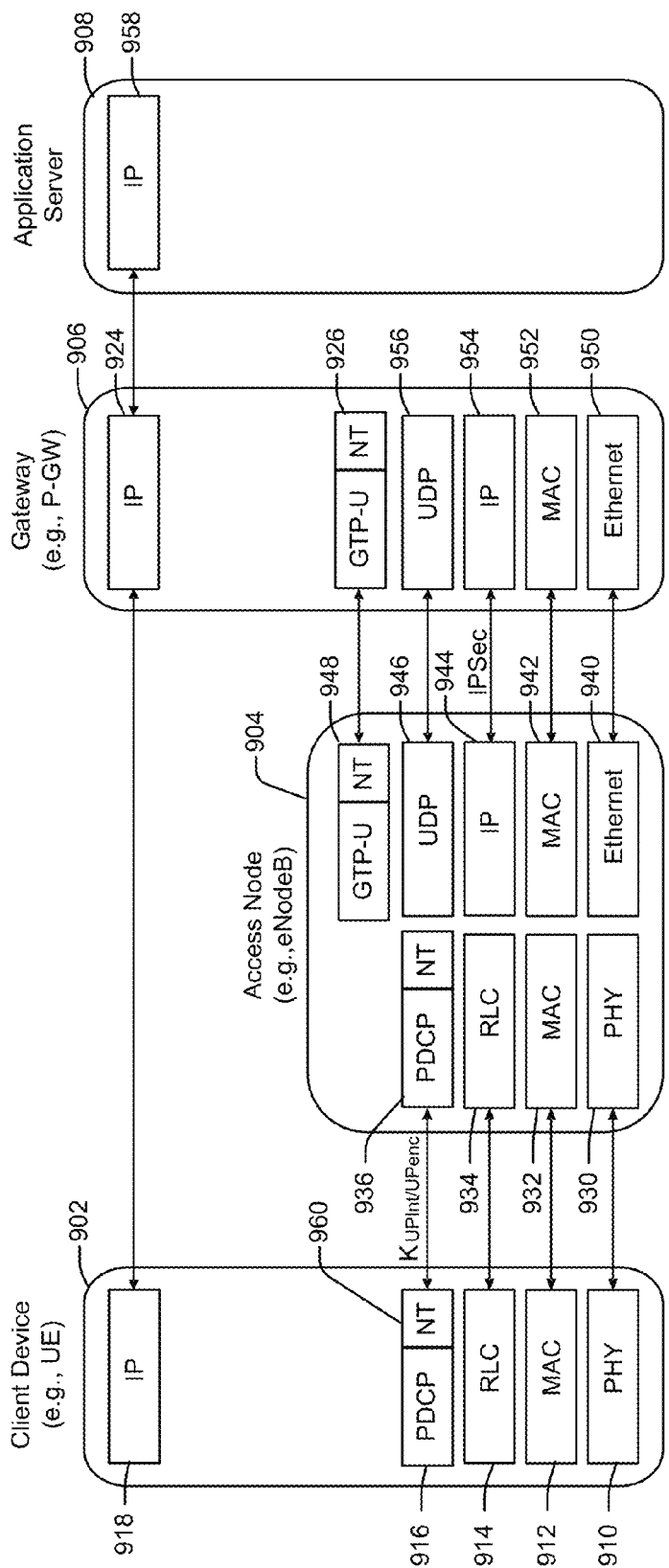
FIG. 9 is an exemplary illustration of user-plane protocol stacks of a system in accordance with another aspect described herein.

FIG. 9 is an exemplary illustration of user-plane protocol stacks of a system in accordance with another aspect described herein. FIG. 9 depicts a client device 902, an access node 904, a gateway 906, and an application server 908.

The aspect illustrated by FIG. 9 may be useful for movement of a network token 960 from the client device 902 to the gateway 906 via the access node 904. In this aspect, a shim layer is not required. By way of example, the client device 902 may receive a network token 960 from the gateway 906 via a control-plane signaling/message set-up method described above (not illustrated in FIG. 9). In accordance with one aspect of the use of the network token, the client device 902 may include the network token 960 in packets destined for the application server 908. The packet including the network token 960 may be carried in a PDCP layer 916 header from the client device 902 to the PDCP layer 936 of the access node 904. The access node 904 may copy the network token found in the PDCP header into a GTP-U header. The packet including the network token 960 may then be carried in the GTP-U layer 948 header from the access node 904 to the GTP-U layer 926 of the gateway 906. That is, in one aspect, the network token may be carried in a general packet radio service (GPRS) tunneling protocol (GTP) header. In one exemplary aspect, the network token originally sent to the client device 902 from the gateway 906 may have been created using a secret key known to the gateway. In such an aspect, the access node 904 would be unable to verify the network token (because it would not possess the secret key needed for verification). Accordingly, an exemplary purpose of the access node 904 in the illustration of FIG. 9 is to copy the network token from one header to another, thereby forwarding the network token from the client device 902 to the gateway 906 via already existing PDCP layer 936 header and GTP-U layer 948 header. Once the network token arrives at the gateway, if verification of the network token (described below) at the gateway 906 is successful, the gateway 906 may forward the packet to the application server 908 after discarding the network token. If verification of the network token 960 at the gateway 906 is not successful, the gateway 906 may discard the packet and network token. In accordance with the illustrate aspect, no change would be needed at the application server 908 to support token based application access.

The layers of the user-plane protocol stacks of the client device 902, access node 904, gateway 906, and application server 908 that were not described in connection with FIG. 9 will not be described as their descriptions are the same or similar to those of like named layers in FIG. 8.

Figure 10:
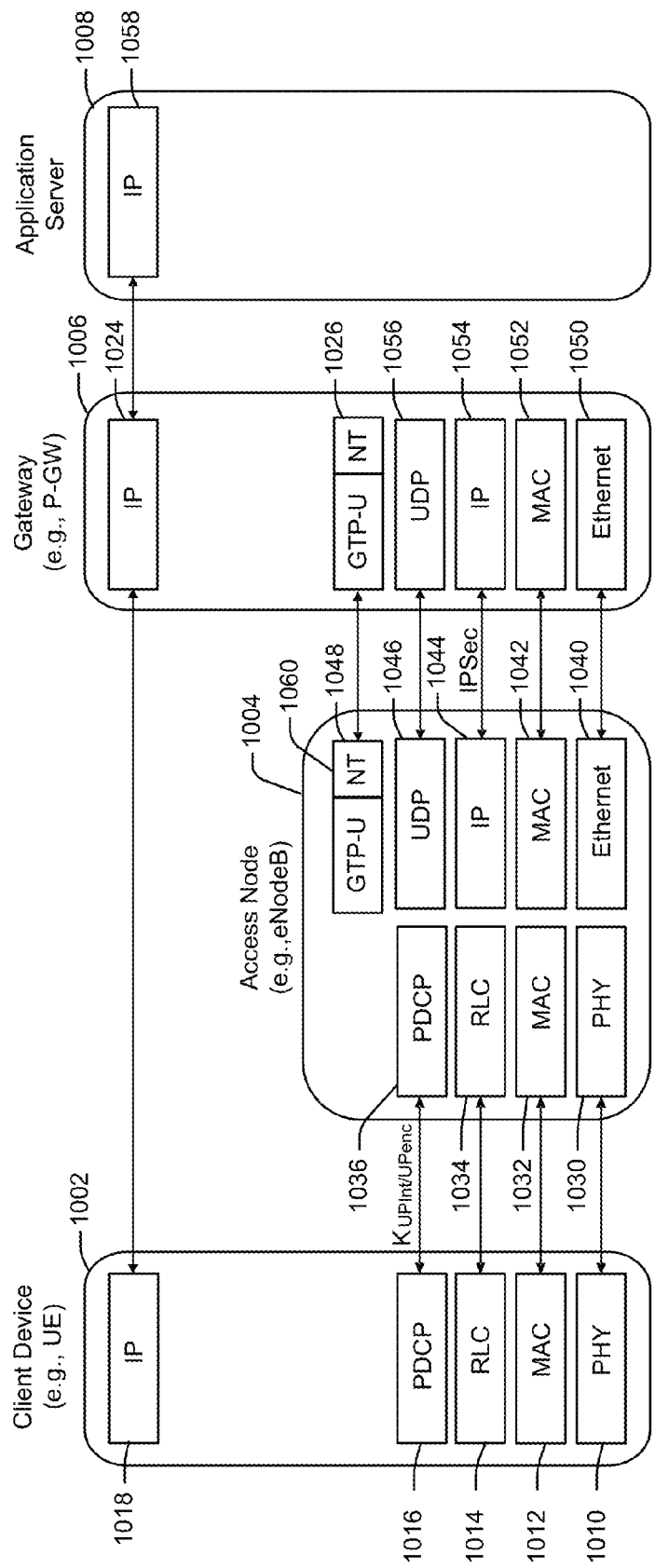
FIG. 10 is an exemplary illustration of user-plane protocol stacks of a system in accordance with still another aspect described herein.

FIG. 10 is an exemplary illustration of user-plane protocol stacks of a system in accordance with still another aspect described herein. FIG. 10 depicts a client device 1002, an access node 1004, a gateway 1006, and an application server 1008.

The aspect illustrated by FIG. 10 may be useful for movement of a network token 1060 from the access node 1004 to the gateway 1006. This aspect may be useful if the client device 1002 is restricted to access a specific service on the application server 1008 and a bearer established to carry traffic from the client device 1002 to the gateway 1006 is set-up as such (e.g., sponsored connectivity). This aspect may also be useful when a trust relationship may not exist between the client device 1002 and the access node 1004, or between the client device 1002 and the gateway 1006. By way of example, in the aspect illustrated by FIG. 10, the client device 1002 does not receive a network token from the gateway 1006. In the aspect illustrated by FIG. 10, the access node 1004 may receive the network token 1060 from the gateway 1006 via a control-plane signaling/message set-up method described above (not illustrated in FIG. 10). In accordance with one aspect of the use of the network token, the access node 1004 may include the network token 1060 in client device 1002 packets destined for the application server 1008. The client device 1002 packet, including the network token 1060, may be carried in a GTP-U layer 1048 header from the access node 1004 to the GTP-U layer 1026 of the gateway 1006. Once the network token arrives at the gateway, if verification of the network token (described below) at the gateway 1006 is successful, the gateway 1006 may forward the packet to the application server 1008 after discarding the network token. If verification of the network token 1060 at the gateway 1006 is not successful, the gateway 1006 may discard the packet and network token. In accordance with the illustrate aspect, no change would be needed at the application server 1008 to support token based application access.

The layers of the user-plane protocol stacks of the client device 1002, access node 1004, gateway 1006, and application server 1008 that were not described in connection with FIG. 10 will not be described as their descriptions are the same or similar to those of like named layers in FIG. 8.

Figure 11:
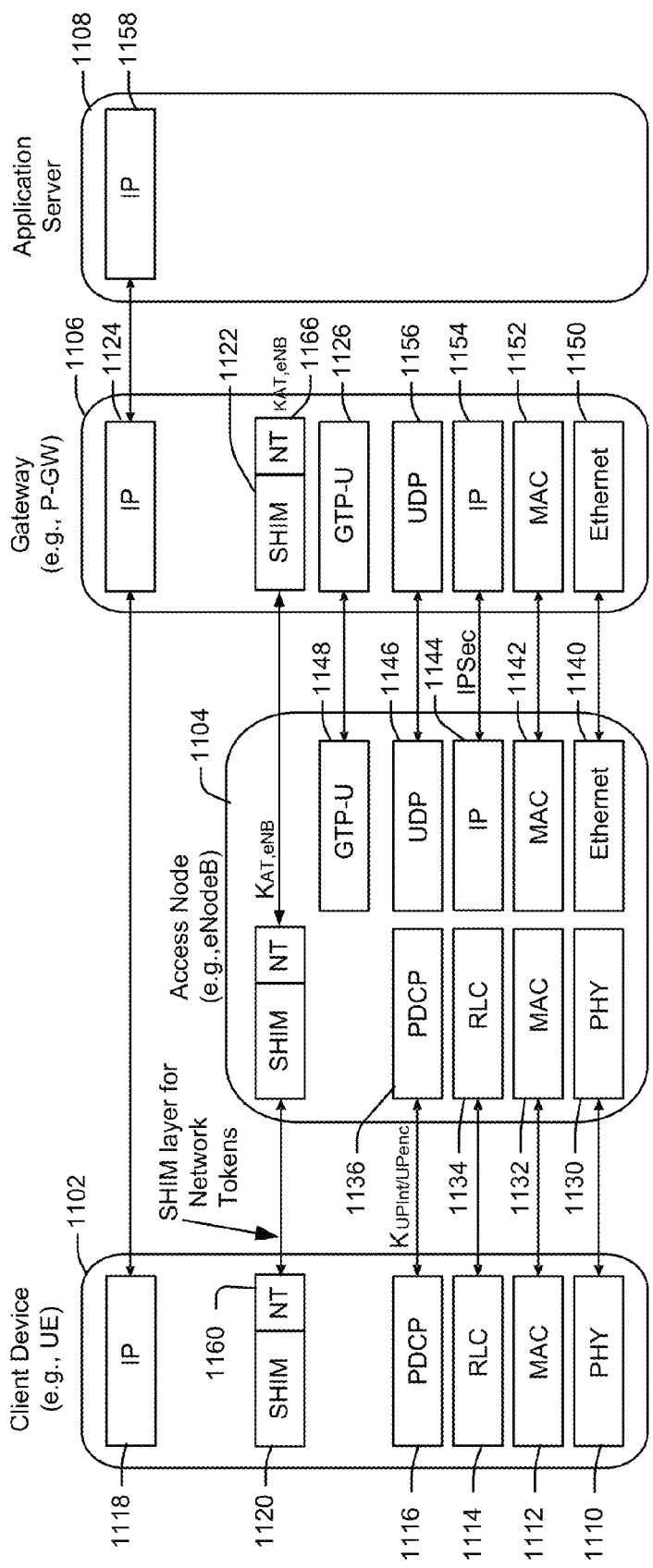
FIG. 11 is an exemplary illustration of user-plane protocol stacks of a system in accordance with still another aspect described herein.

FIG. 11 is an exemplary illustration of user-plane protocol stacks of a system in accordance with still another aspect described herein. FIG. 11 depicts a client device 1102, an access node 1104, a gateway 1106, and an application server 1108.

In one aspect, a shim layer 1162 may be added to the user-plane protocol stack of a client device 1102, a corresponding shim layer 1164 may be added the protocol stack of the access node 1104, and an additionally corresponding shim layer 1166 may be added the protocol stack of the gateway 1106. Shim layers 1162, 1164, and 1166 facilitate movement of network tokens from the client device 1102 to the access node 1104 and from the access node 1104 to the gateway 1106 in accordance with aspects described herein. In one aspect, the shim layer 1162 lies below the IP layer 1118 and above the MAC layer 1112 of the client device 1102. In this aspect, the corresponding shim layer 1164 lies above a PDCP layer 1136 of the access node 1104. In this aspect, the additional corresponding shim layer 1166 lies below the IP layer 1124 and above the GTP-U layer 1126 of the gateway 1106.

The aspect illustrated by FIG. 11 may be useful for movement of a network token 1160 from the client device 1102 to the gateway 1106 via the access node 1104, where the access node 1104 is recipient of a secret key specific to the access node ($K_{NT,\ eNB}$) that may be used to validate a network token. By way of example, the client device 1102 may receive a network token from the gateway 1106 via a control-plane signaling/message set-up method described above (not illustrated in FIG. 11). In addition, the access node 1104 may receive a secret key specific to the access node ($K_{NT,\ eNB}$) derived by the gateway 1106 and used by the gateway 1106 to derive the network token sent to the client device 1102 via a control-plane signaling/message set-up method described above (not illustrated in FIG. 11). In accordance with one aspect of the use of the network token, the client device 1102 may include the network token in packets destined for the application server 1108. The shim header of the shim layer 1162 may carry the network token 1160 to the corresponding shim layer 1164 of the access node 1104 as shown in FIG. 11. The access node 1104 may use the secret key specific to the access node provided to it by the gateway 1106 to verify the network token included with the client device packet. If verification of the network token (described below) at the access node 1104 is successful, the access node 1104 may forward the client device packet and the network token to the gateway 1106. If verification of the network token 1160 at the access node 1104 is not successful, the access node 1104 may discard the packet and network token. If verification of the network token (described below) at the access node 1104 was successful and the client device packet and network token were forwarded to the gateway 1106, a second verification process may be conducted at the gateway 1106. If verification of the network token (described below) at the gateway 1106 is successful, the gateway 1106 may forward the packet to the application server 1108 after discarding the network token. If verification of the network token 1160 at the gateway 1106 is not successful (notwithstanding success at the access node 1104), the gateway 1106 may discard the packet and network token. In accordance with the illustrate aspect, no change would be needed at the application server 1108 to support token based application access.

In accordance with the aspect illustrated in FIG. 11, the access node 1104 can verify a token sent to the client device 1102 by the gateway 1106. Verification at the access node 1104 is possible because the gateway 1106 may derive a secret key specific to the access node (derivation explained above in connection with token set-up). This may enable an access node 1104 to filter unauthorized client device traffic destined to an application server before that traffic is injected deep into the network, which thereby may prevent network resources from being used to deliver unauthorized traffic.

The layers of the protocol stacks of the client device 1102, access node 1104, gateway 1106, and application server 1108 that were not described in connection with FIG. 11 will not be described as their descriptions are the same or similar to those of like named layers in FIG. 8.

Figure 12:
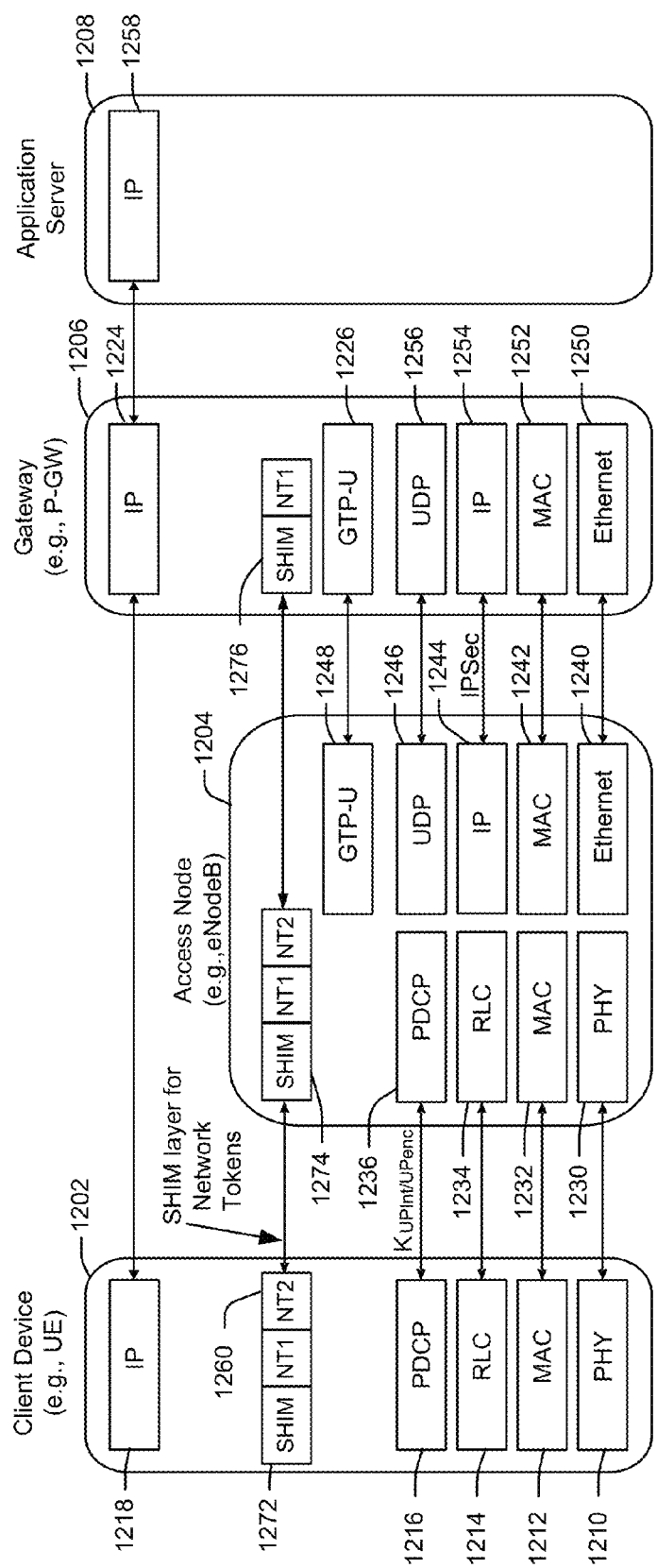
FIG. 12 is an exemplary illustration of user-plane protocol stacks of a system in accordance with still another aspect described herein.

FIG. 12 is an exemplary illustration of user-plane protocol stacks of a system in accordance with still another aspect described herein. FIG. 12 depicts a client device 1202, an access node 1204, a gateway 1206, and an application server 1208.

In one aspect, a shim layer 1272 may be added to the protocol stack of a client device 1202, a corresponding shim layer 1274 may be added the protocol stack of the access node 1204, and an additionally corresponding shim layer 1276 may be added the protocol stack of the gateway 1206. Shim layers 1272, 1274, and 1276 facilitate movement of network tokens from the client device 1202 to the access node 1204 and from the access node 1204 to the gateway 1206 in accordance with aspects described herein. In one aspect, the shim layer 1272 lies below the IP layer 1218 and above the MAC layer 1212 of the client device 1202. In this aspect, the corresponding shim layer 1274 lies above a PDCP layer 1236 of the access node 1204. In this aspect, the additional corresponding shim layer 1276 lies below the IP layer 1224 and above the GTP-U layer 1226 of the gateway 1206.

The aspect illustrated by FIG. 12 may be useful for movement of a network token 1260 from the client device 1202 to the gateway 1206 via the access node 1204, where both the access node 1204 and the gateway 1206 may issue network tokens for the client device 1202. By way of example, the client device 1202 may receive a network token NT2 from the access node 1204 and a separate network token NT1 from the gateway 1206 via a control-plane signaling/message set-up method described above (not illustrated in FIG. 12). In accordance with one aspect of the use of the network tokens, NT1, NT2 received from the gateway 1206 and access node 1204, respectively, the client device 1202 may include the network tokens NT1, NT2 in packets destined for the application server 1208. The shim header of the shim layer 1272 may carry the network tokens NT1, NT2 to the corresponding shim layer 1274 of the access node 1204 as shown in FIG. 12. The access node 1204 may use a secret key known to the access node 1204 to verify the network token NT2 included with the client device packet. If verification of the network token NT2 at the access node 1204 is successful, the access node 1204 may discard the network token NT2 and forward the packet and the network token NT1 to the gateway 1206. If verification of the network token NT2 at the access node 1204 is not successful, the access node 1204 may discard the packet and network tokens.

If verification of the network token NT2 at the access node 1204 was successful and the packet and network tokens NT1 were forwarded to the gateway 1206, a second verification process may be conducted at the gateway 1206. If verification of the network token NT1 at the gateway 1206 is successful, the gateway 1206 may forward the packet to the application server 1208 after discarding the network token NT1. If verification of the network token NT1 at the gateway 1206 is not successful (notwithstanding success at the access node 1204), the gateway 1206 may discard the packet and network token NT1. In accordance with the illustrated aspect, no change would be needed at the application server 1208 to support token based application access.

In accordance with the aspect illustrated in FIG. 12, the access node 1204 can verify a token sent to the client device 1202, where the network token was derived by the access node 1204 itself. This may enable an access node 1204 to filter unauthorized client device traffic destined to an application server before that traffic is injected deep into the network, which thereby may prevent network resources from being used to deliver unauthorized traffic. This aspect may be useful when there is no trust relationship assumed between the access node 1204 and the gateway 1206. Accordingly, this option may be most useful if the access node 1204 and the gateway 1206 are owned/run by different operators.

The layers of the protocol stacks of the client device 1202, access node 1204, gateway 1206, and application server 1208 that were not described in connection with FIG. 12 will not be described as their descriptions are the same or similar to those of like named layers in FIG. 8.

Figure 13:
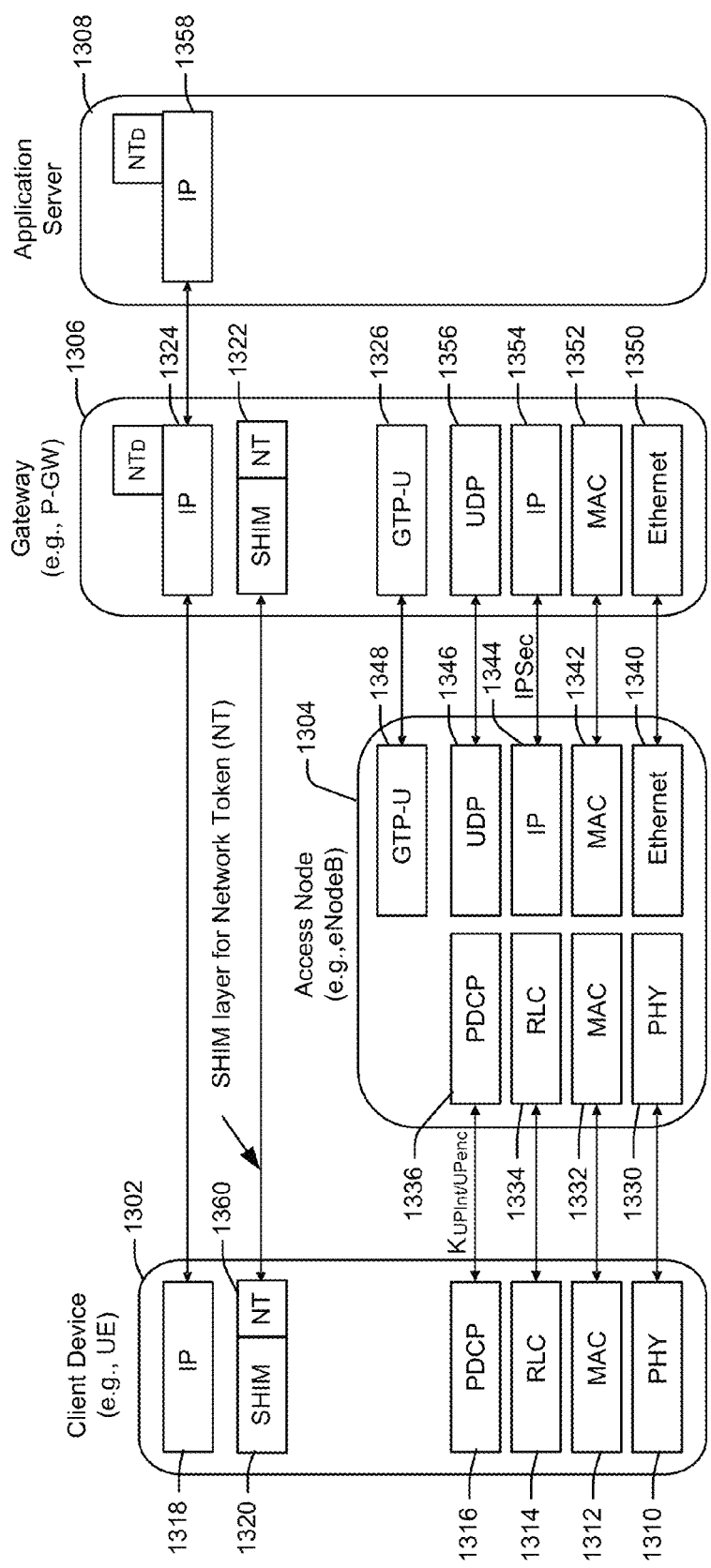
FIG. 13 is an exemplary illustration of user-plane protocol stacks of a system in accordance with still another aspect described herein.

FIG. 13 is an exemplary illustration of user-plane protocol stacks of a system in accordance with still another aspect described herein. FIG. 13 depicts a client device 1302, an access node 1304, a gateway 1306, and an application server 1308.

In one aspect, a shim layer 1320 may be added to the protocol stack of a client device 1302 and a corresponding shim layer 1322 may be added the protocol stack of the gateway 1306. Shim layer 1320 and corresponding shim layer 1322 facilitate movement of network tokens from the client device 1302 to the gateway 1306 in accordance with aspects described herein. In one aspect, the shim layer 1320 lies below the IP layer 1318 and above the MAC layer 1312 of the client device 1302. In this aspect, corresponding shim layer 1322 lies below the IP layer 1324 and above the GTP-U layer 1326 of the gateway 1306.

Additionally, FIG. 13 depicts downlink network tokens, $NT_D$. The downlink token may be used for prioritization and filtering. The downlink network token was described in connection with token set-up (above). By way of example, the client device 1302 may receive a network token NT from the gateway 1306 via a control-plane signaling/message set-up method described above (not illustrated in FIG. 13). The client device 1302 may also receive a second network token $NT_D$ from the gateway 1306 via a control-plane signaling/message set-up method described above (not illustrated in FIG. 13). In accordance with one aspect of the use of the network tokens, the downlink network token $NT_D$ may be delivered to the application server 1308 from the client device 1302 via a control-plane signaling/message set-up method described above (not illustrated in FIG. 13). Thereafter, in use, the application server 1308 may include the downlink network token $NT_D$ in downlink packets sent to the gateway 1306 and destined for the client device 1302. The gateway 1306 may use the downlink network token $NT_D$ for prioritization and filtering.

The layers of the protocol stacks of the client device 1302, access node 1304, gateway 1306, and application server 1308 that were not described in connection with FIG. 13 will not be described as their descriptions are the same or similar to those of like named layers in FIG. 8.

Exemplary Device

Figure 14:
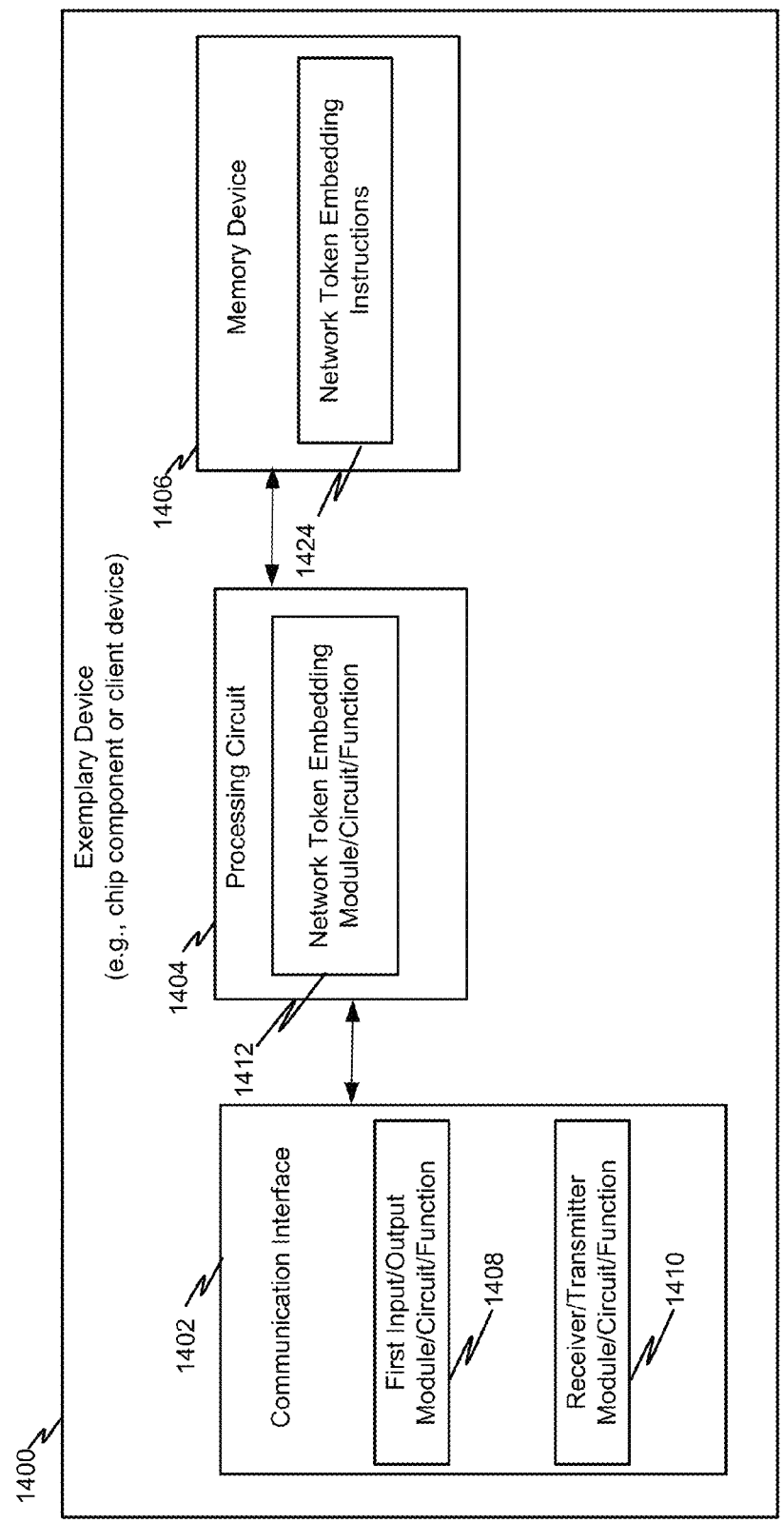
FIG. 14 is a block diagram illustrating an exemplary device adapted to support network token based application access.

FIG. 14 is a block diagram illustrating an exemplary device 1400 adapted to support network token based application access. As used herein, the term "device" may describe a chip component and/or an end user device such as a client device (e.g., mobile device, user equipment, user device). In one example, the exemplary device 1400 may include a communication interface circuit 1402, a processing circuit 1404 coupled to the communication interface circuit 1402, and a memory device 1406 (e.g., magnetic and/or optical device to store data) coupled to the processing circuit 1404. This list is non-limiting.

The communication interface circuit 1402 may include a first input/output circuit/function/module 1408 for input/output operations with a user. The communication interface circuit 1402 may include a receiver/transmitter circuit/function/module 1410 for wireless communication with access nodes. This list is non-limiting.

The processing circuit 1404 may include or implement one or more processors, application specific processors, hardware and/or software modules, etc., that are adapted to support token based application access. For example, a network token embedding module/circuit/function 1412 may be adapted to embed (include) network tokens in packets forwarded to an access node and/or a gateway. This example is non-limiting.

The memory device 1406 may be adapted to include network token embedding instructions 1422, cryptographic validation/verification instructions 1424, and secret key storage and instructions. This list is non-limiting.

Figure 15:
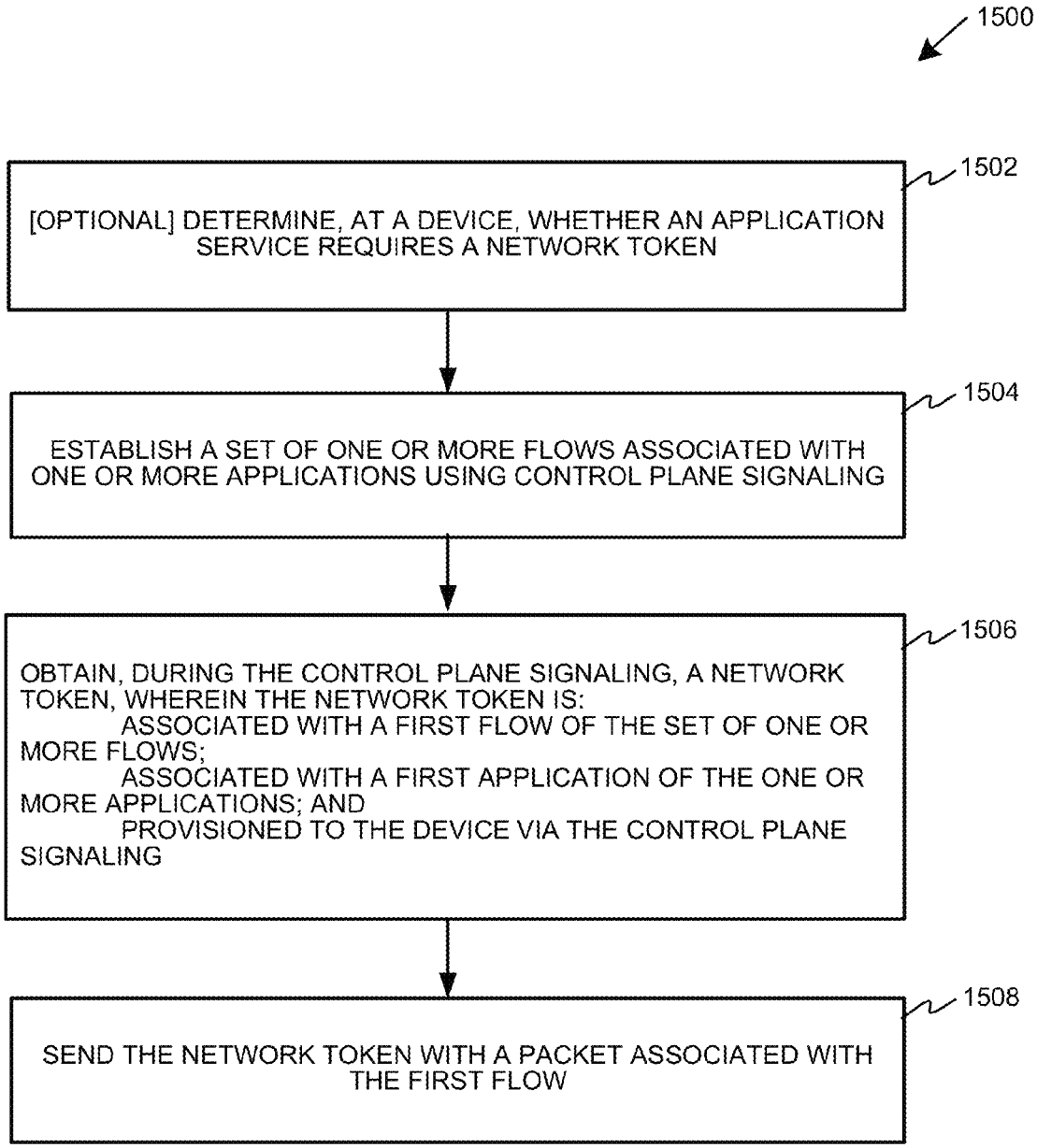
FIG. 15 is an exemplary method through which a device may obtain a network token.

FIG. 15 is an exemplary method 1500 through which a device may obtain a network token. The exemplary method 1500 may be operational at the device. In one aspect, the device may establish a connection with an access node using c-plane signaling. For example, in such an aspect, a bearer may be established at an access node. In one aspect, the device may establish 1504 a set of one or more flows associated with one or more applications using control plane signaling. The one or more flows may be defined based on a policy. The policy may be a network policy such as a network access policy. The device may obtain 1506, during the control plane signaling, a network token, wherein the network token may be derived in accordance with a network access policy, associated with a first flow of the set of one or more flows, associated with a first application of the one or more applications, and provisioned to the device via the control plane signaling.

In one aspect, prior to establishing the set of one or more flows associated with one or more applications using control plane signaling, the device may optionally determine 1502 whether the application service requires a network token.

In one aspect, the exemplary method 1500 may further include sending 1508, from the device, the network token with a packet associated with the first flow. The method is not limited to sending only one network token with one packet. The method may include sending the network token with one or more packets associated with the first flow or may include sending the network token with every packet associated with the first flow.

In one aspect, the application service may be associated with the hearer or an access point name (APN). Establishing the bearer may be initiated in a network by a mobility management entity (MME) or a packet data network gateway (P-GW). As used herein, the establishment of a bearer may include activation of a default bearer, activation of a dedicated bearer, or modification of an already established bearer. The steps of establishing the bearer and obtaining the network token may be implemented in control messages. The network token may be associated with (e.g., bound to) the device and application service. The network token may be associated with one or more flows and one or more applications.

In one aspect, establishment of the bearer may be initiated by the device. Steps that may be implemented to establish the bearer, or an APN, may include sending, from the device, a packet data network (PDN) connection request; sending, from the device, a dedicated bearer activation request; or sending, from the device, a bearer modification request.

In one aspect, establishing the bearer may include requesting a network token, wherein the requesting may be implicit or explicit. Requesting may include identifying the application service by an application identifier (App ID) or a service data flow (SDF) in a control message.

As indicated above, a device may determine whether the application service requires the network token before requesting the network token. In such an instance, the determination may be based on an indication received from a network, an indication received from the application service, a configuration of the application service, and/or a response to a query.

By way of example, the indication received from the network may be included in a signaling transport layer (SIB) message or a non-access stratum (NAS) message as part of an attach process. The indication received from the network may be stored in connection with configuration of the application service. The indication received from the network may be received during creation of a subscription to the application service or downloaded as a software upgrade to the application service. The indication received from the network may be received as part of a policy.

By way of example, the configuration of the application service may be based on a policy of the application service or on a policy of a connectivity provider hosting a transport or connection service to the application service.

Figure 16:
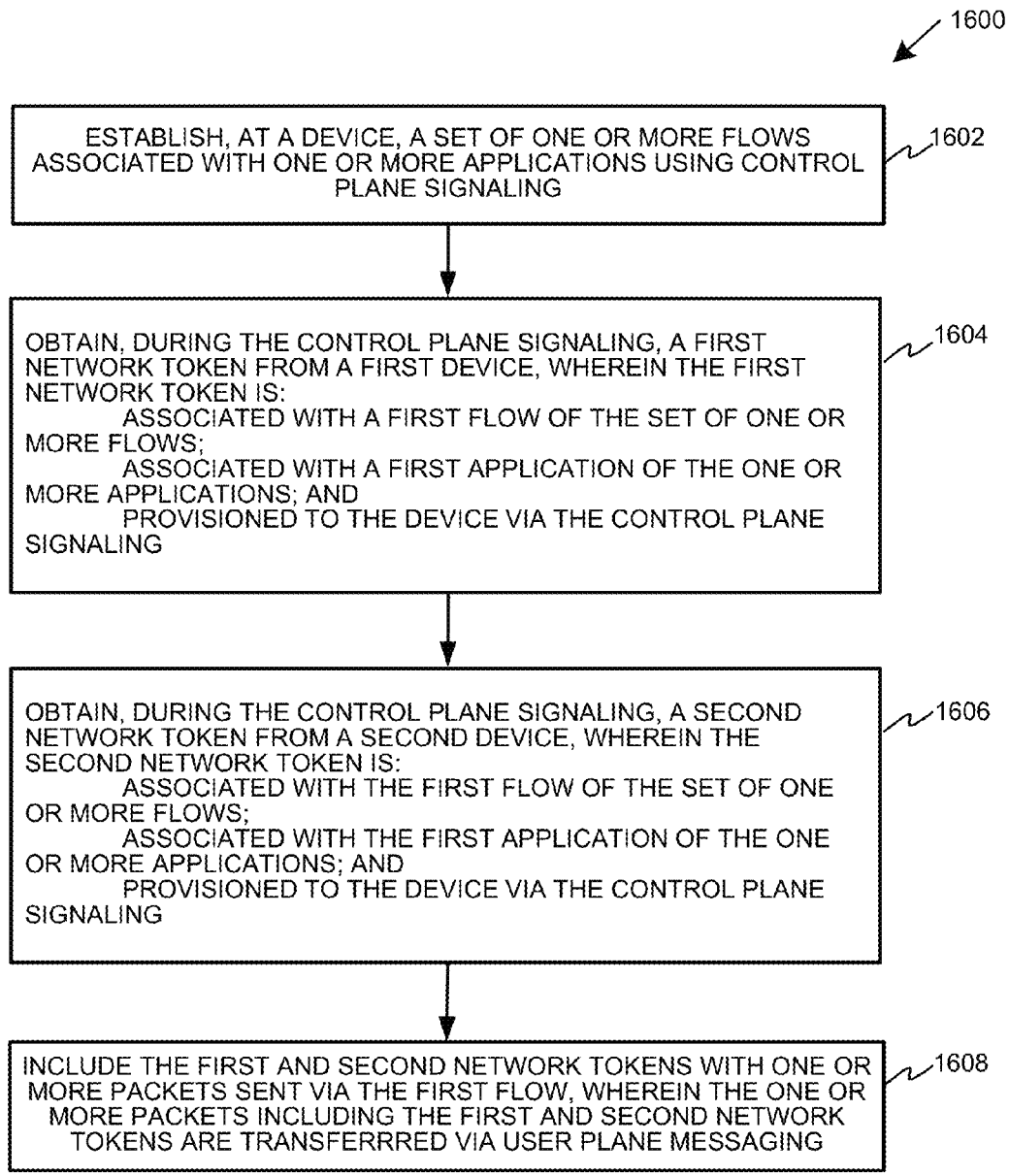
FIG. 16 is an exemplary method through which a device may obtain a network token from a gateway device and a separate network token from an access node.

FIG. 16 is an exemplary method 1600 through which a device may obtain a network token from a gateway device and a separate network token from an access node. The exemplary method 1600 may be operational at the device. In one aspect, the device may establish a connection with an access node using c-plane signaling. For example, in such an aspect, a bearer may be established at an access node. In one aspect, the device may establish 1602 a set of one or more flows associated with one or more applications using control plane signaling. The one or more flows may be defined based on a policy. The policy may be a network policy such as a network access policy. The device may obtain 1604, during the control plane signaling, a first network token, wherein the first network token may be derived by a first device (e.g., a P-GW, a gateway device) in accordance with a network access policy. The first network token may be associated with a first flow of the set of one or more flows, a first application of the one or more applications, and may further be provisioned to the device via the control plane signaling.

A network access policy may associate a flow from a device to an application service. The method may then include obtaining, at the device, a first network token to associate packets with the flow in accordance with the network access policy 1604. The method may farther continue by including the first network token in packets associated with the flow, which are destined for the application service. In one aspect, the device may include 1606 the first network token in one or more packets destined for the application. The method may further include an optional step of obtaining, at the device, a second network token to associate packets with a flow in accordance with an access policy 1608. Following the optional step, the method may further include an optional step of including the second network token in one or more packets destined for the application 1610.

The first and second network tokens may be obtained by the device in a control message.

Exemplary Access Node

Figure 17:
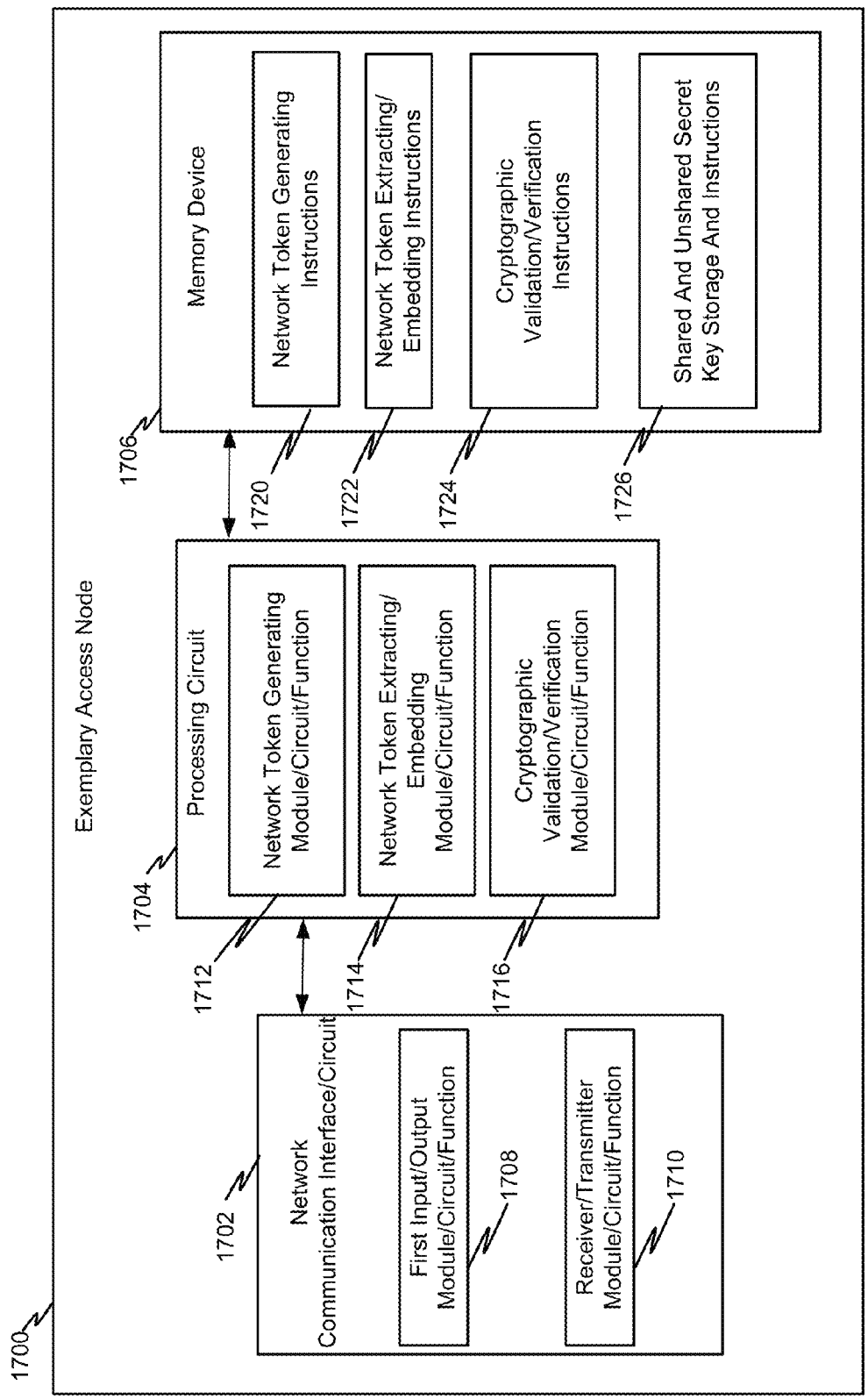
FIG. 17 is a block diagram illustrating an exemplary access node adapted to support token based application access.

FIG. 17 is a block diagram illustrating an exemplary access node 1700 (e.g., eNodeB) adapted to support token based application access. In one example, the exemplary access node 1700 may include a network communication interface circuit 1702, a processing circuit 1704 coupled to the network communication interface circuit 1702, and a memory device 1706 (e.g., magnetic and/or optical device to store data) coupled to the processing circuit 1704. This list is non-limiting.

The network communication interface circuit 1702 may include a first input/output circuit/function/module 1708 for communication with a P-GW via an S-GW. The network communication interface circuit 1702 may include a receiver/transmitter circuit/function/module 1710 for wireless communication with client devices. This list is non-limiting.

The processing circuit 1704 may include or implement one or more processors, application specific processors, hardware and/or software modules, etc., that are adapted to support token based application access. For example, a network token deriving circuit/function/module 1712 may be adapted to derive tokens based on an a secret key known only to a gateway, or a secret key known to the gateway and/or another entity, such as a secret key specific to an access node, that may be stored in the memory device 1706. By way of another example, a network token extracting/embedding module/circuit/function 1714 may be adapted to extract network tokens from uplink packets from a client device and/or embed (include) network tokens in packets forwarded to a gateway. By way of still another example, a cryptographic validation/verification module/circuit/function 1716 may be adapted to validate/verify network tokens received, for example, from client devices. This list is non-limiting.

The memory device 1706 may be adapted to include network token deriving instructions 1720, network token extracting/embedding instructions 1722, cryptographic validation/verification instructions 1724, and secret key storage and instructions. This list is non-limiting.

Figure 18:
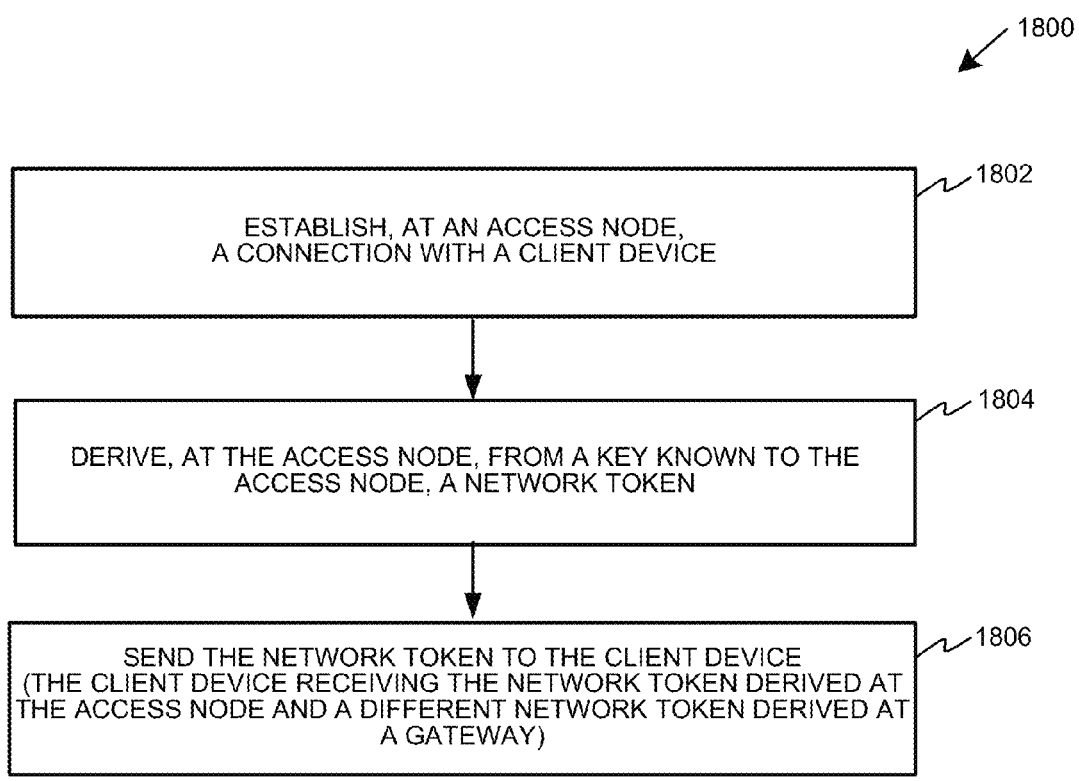
FIG. 18 illustrates an exemplary method of setting up (e.g., deriving a network token and provisioning the network token to a client device) a network token at an access node (e.g., eNodeB).

FIG. 18 illustrates an exemplary method 1800 of setting up (e.g., deriving a network token and provisioning the network token to a client device) a network token at an access node (e.g., eNodeB).

By way of example, the access node may establish a connection with a client device 1802. The access node may derive, from a key known to the access node, a network token 1804. The access node may send the network token derived at the access node to the client device 1806. The network token derived at the access node may be sent to the client device via control plane signaling. In one aspect, a client device may receive a network token derived at a P-GW and the network token derived at the access node via control plane signaling. The network tokens may be different from each other. The network token derived at the P-GW may be derived from a secret key known to the P-GW, and network token derived at the access node may be derived from a secret key known to the access node. The secret key known to the P-GW may be known only to the P-GW. The secret key known to the access node may be known only to the access node. The secret key known to the P-GW and the secret key known to the access node may be different from one another. Including a network token derived at the access node, as well as a network token derived at the P-GW with UL packets sent from a client device may permit the access node to verify the UL packet before sending it deeper into the network.

In the above described example, the establishment of contact with a client device and the sending of the network token from the access node to the client device may be implemented in control messages. The network token derived at the access node may be associated with (e.g., bound to) the client device, the access node, and an application service.

Figure 19:
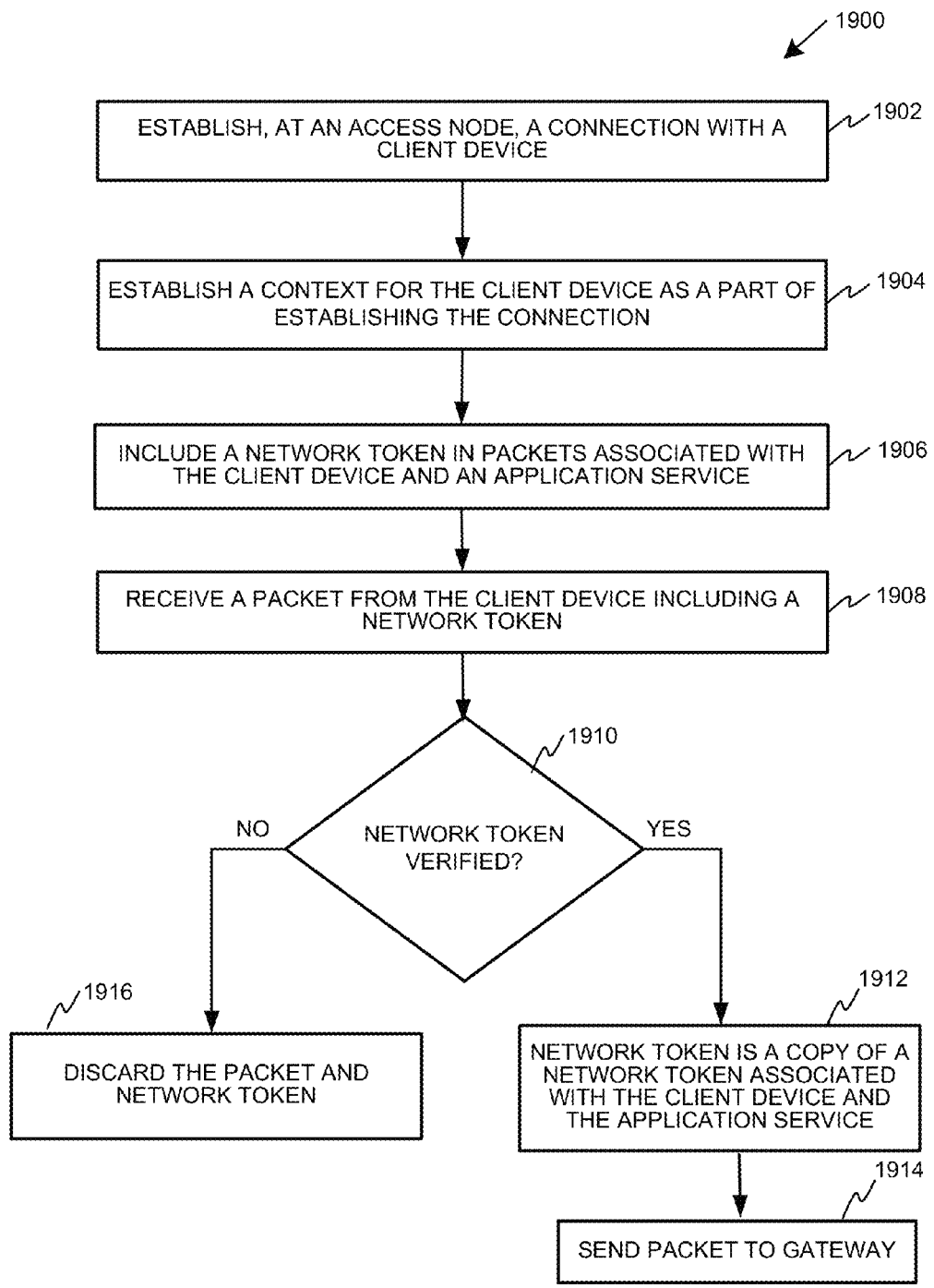
FIG. 19 is flow diagram of an exemplary method operational at an access node.

FIG. 19 is flow diagram of an exemplary method 1900 operational at an access node. The method may include establishing a connection with a client device 1902. The method may include establishing a context for the client device as a part of establishing the connection 1904. The method may continue by including a network token in packets associated with the client device and an application service 1906. The context may include a network token, wherein the network token is associated with (e.g., bound to) the client device and the application service. The method may further include receiving or obtaining a packet from the client device including a network token 1908. A determination of the validity of the network token may be undertaken 1910. If the network token is a copy of a network token associated with the client device and the application service the network token may be determined to be valid 1912. The method may further include sending the packet including the copy of the network token to a gateway if the network token is valid 1914. It the network token is determined to be invalid, the access node may discard the packet and the network token 1916.

Figure 20:
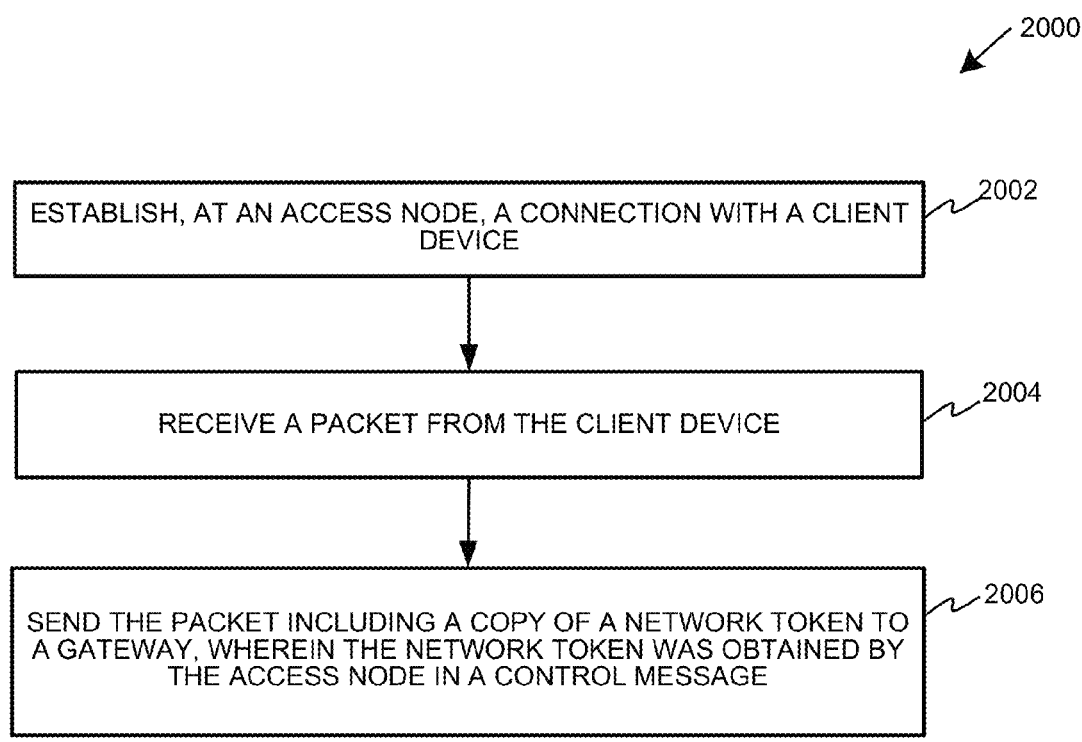
FIG. 20 is flow diagram of another exemplary method operational at an access node.

FIG. 20 is flow diagram of another exemplary method 2000, operational at an access node. The method may include establishing a connection with a client device 2002. The method may include receiving or obtaining a packet from the client device 2004. The method may further include sending the packet including a copy of a network token to a gateway, wherein the network token was obtained by the access node in a control message 2006.

Figure 21:
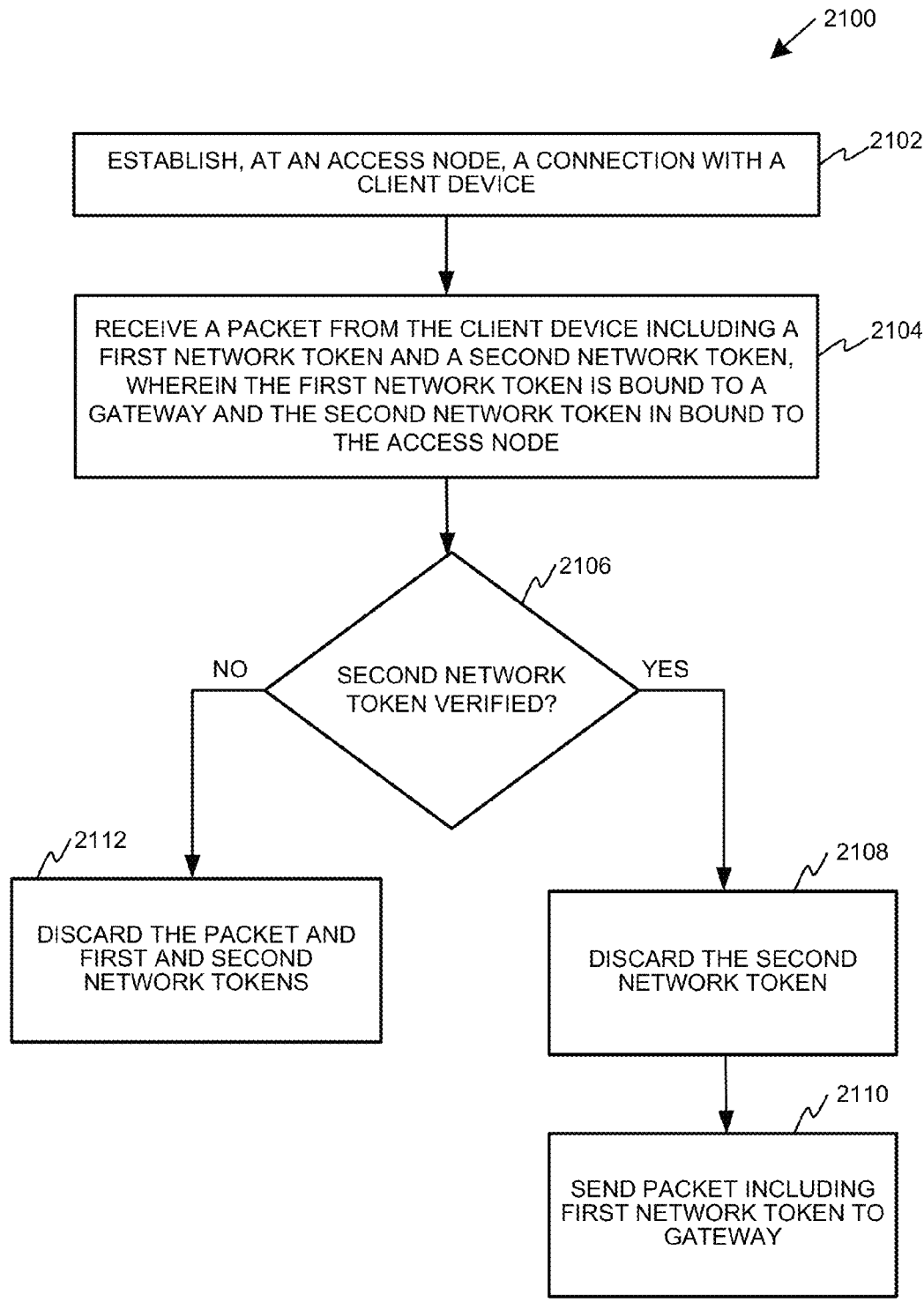
FIG. 21 is flow diagram of still another exemplary method operational at an access node.

FIG. 21 is flow diagram of still another exemplary method 2100, operational at an access node. The method may include establishing a connection with a client device 2102. The method may include obtaining a packet from the client device including a first network token and a second network token, wherein the first network token is associated with (e.g., bound to) a gateway and the second network token is associated with (e.g., bound to) the access node 2104. The method may continue with validating/verifying the second network token at the access node 2106. If the validating/verifying is successful, the access node may discard 2108 the second network token. The access node may then send 2110 the packet including the first network token to a gateway. If the validating/verifying is not successful, the access node may discard the packet and the first and second network tokens 2112.

Exemplary Gateway

Figure 22:
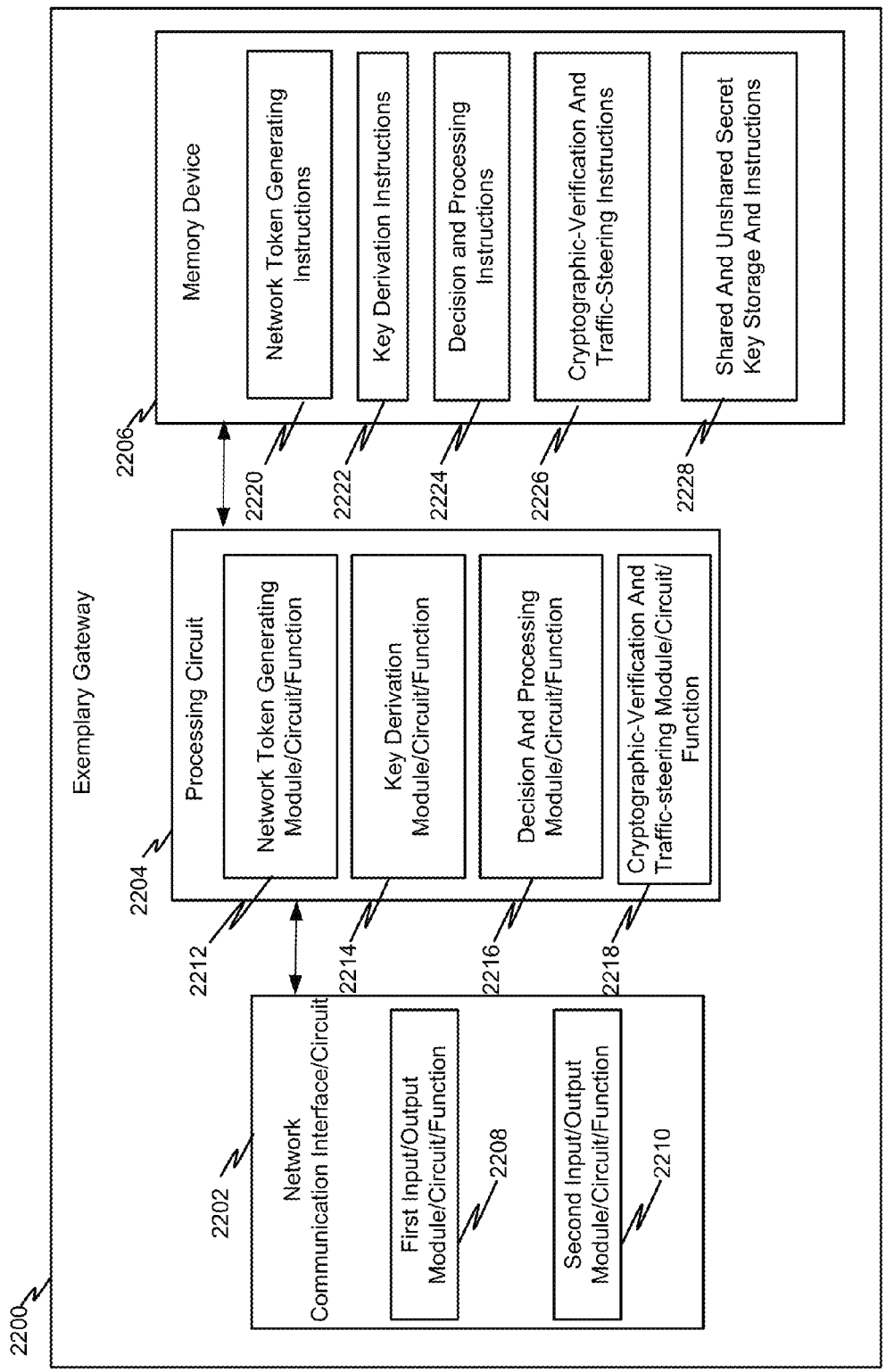
FIG. 22 is a block diagram illustrating an exemplary gateway adapted to support token based application access.

FIG. 22 is a block diagram illustrating an exemplary gateway 2200 adapted to support token based application access. In one example, the exemplary gateway 2200 may include a network communication interface circuit 2202, a processing circuit 2204 coupled to the network communication interface circuit 2202, and memory device 2206 (e.g., magnetic and/or optical device to store data) coupled to the processing circuit 2204. This list is non-limiting.

The network communication interface circuit 2202 may include a first input/output circuit/function/module 2208 for communication with a serving gateway and a second input/output circuit/function/module 2210 for communication with a packet data network. The first in put/output circuit/function/module 2208 may handle multiple IP flows established on multiple bearers. The second input/output circuit/function/module 2210 may handle multiple IP flows with multiple servers on the packet data network. This list is non-limiting.

The processing circuit 2204 may include or implement one or more processors, application specific processors, hardware and/or software modules, etc., that are adapted to support token based application access. For example, a network token deriving circuit/function/module 2212 may be adapted to derive tokens based on a secret key that may be stored in the memory device 2206. The secret key may be known only to the gateway. By way of another example, a key derivation circuit/function/module 2214 may be adapted to derive a secret key specific to an access node based on, for example, the secret key that may be stored in the memory device 2206 and an identifier of a given access node. By way of yet another example, a decision and processing circuit/function/module 2216 may be adapted to decide if uplink packets received from the EPS bearers, or downlink packets received from an application server, include network tokens and if so, may be further adapted to pass the received packets to a cryptographic-validation and traffic-steering circuit/function/module 2218. The decision and processing circuit/function/module 2216 may be further adapted to pass received packets that do not include network tokens to a service data flow filter bank (not shown). This list is non-limiting.

The memory device 2206 may be adapted to include network token deriving instructions 2220, key derivation instructions 2222, decision and processing instructions 2224, cryptographic-validation and traffic-steering instructions 2226, and secret key storage and instructions. This list is non-limiting.

Figure 23:
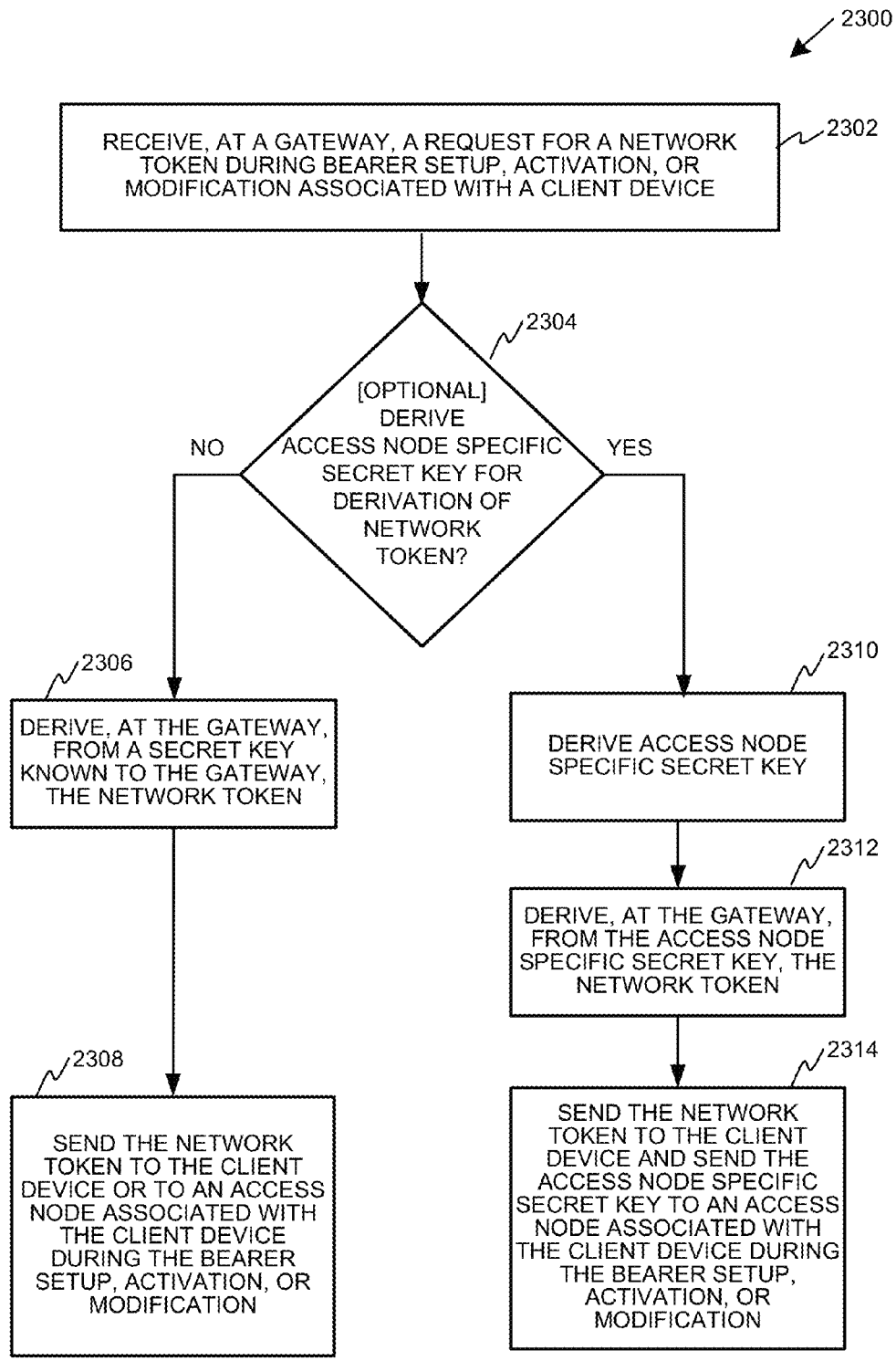
FIG. 23 illustrates an exemplary method of setting up (e.g., deriving a network token and provisioning the network token to a client device) a network token at a gateway (e.g., a P-GW).

FIG. 23 illustrates an exemplary method 2300 of setting up (e.g., deriving a network token and provisioning the network token to a client device) a network token at a gateway (e.g., a P-GW).

By way of example, a gateway may receive a request for a network token during bearer setup, activation, or modification associated with a client device 2302. As an optional step, a determination of whether to derive a secret key specific to an access node (e.g., eNodeB) for the derivation of the network token may be made 2304. If the optional step 2304 is not used, or if the determination of whether to derive the secret key specific to the access node results in a decision to not derive the secret key specific to the access node, the method may proceed to derive 2306, at the gateway, from a secret key known only to the gateway, the network token. The gateway may next send the network token to the client device or to an access node associated with the client device during the bearer setup, activation, or modification 2308. If the optional step 2304 is used, or if the determination of whether to derive a secret key specific to the access node results in a decision to derive a secret key specific to the access node, the method may advance to a step of deriving the secret key specific to the access node 2310. The secret key specific to the access node (e.g., eNB) may be derived using a key derivation function (KDF) having inputs including, for example, the secret key known only to the gateway (e.g., $K_{NT}$) and, for example, an identifier of an access node (e.g., eNB identifier). Accordingly, in one exemplary aspect, $K_{NT,\ eNB} = KDF(K_{NT,\ eNB\ ID})$. This exemplary aspect is not intended to be limiting.

According to one aspect, the network token may be derived 2312 from a secret key specific to an access node to which the client device is attached. The method may include sending the network token to the client device, and sending the secret key specific to the access node to the access node 2314.

According to one aspect, an application service for the client device may be identified, wherein the network token sent to the client device or to the access node may be associated with the application service.

According to one aspect, receiving or obtaining a request for the network token and sending the network token (and, in some examples, the derived secret key specific to the access node) are implemented in control messages.

According to one aspect, the deriving of the network token may be based on an access policy. According to yet another aspect, the sending the network token to the client device may further comprise sending the network token to a mobility management entity (MME) and sending the network token to the client device from the MME.

As illustrated in the exemplary FIG. 23, the network token may be derived directly from a secret key known only to the gateway (see step 2306) or may be derived indirectly from the same secret key known only to the gateway, which can be used to derive a secret key specific to the access node (see steps 2310, 2312).

In some aspects, the bearer may be associated with an application identifier (ID) and/or a client device ID. In some aspects the application service may be associated with the bearer or an access point name (APN). In some aspects, the network token may be associated with (e.g., bound to) the client device and the application service.

In some aspects, the bearer may include a plurality of traffic flow templates (TFTs). The plurality of TFTs may correspond to a plurality of application services.

According to yet another aspect, the sending the network token to the client device and sending the secret key specific to the access node to the access node may further comprise sending the network token and the secret key specific to the access node to a mobility management entity (MME), sending the network token to the client device from the MME, and sending the secret key specific to the access node to the access node from the MME.

In another aspect, the network token may be used to enforce an access policy associated with the application service and the secret key specific to the access node may be used to validate the network token included in packets received at the access node before sending the packets to the gateway to prevent unauthorized packets from reaching the gateway.

Figure 24:
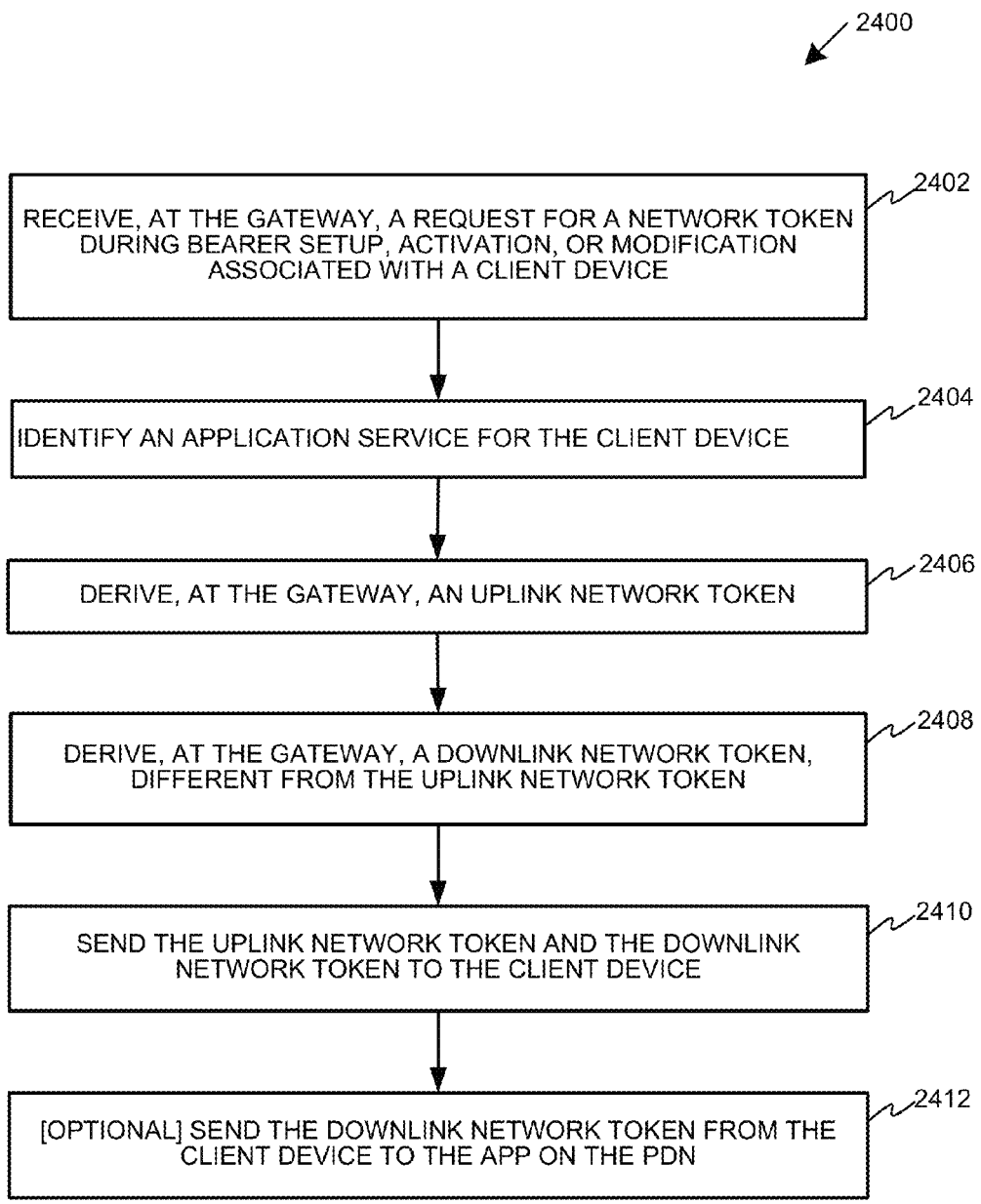
FIG. 24 illustrates an exemplary method of setting up uplink and downlink network tokens at a gateway (e.g., a P-GW).

FIG. 24 illustrates an exemplary method 2400 of setting up uplink and downlink network tokens at a gateway (e.g., a P-GW). In one aspect, a request for a network token during bearer setup, activation, or modification associated with a client device may be received at a gateway 2402. An application service for the client device may be identified 2404. A UL network token may be derived at the gateway 2406. A DL network token, different from the UL network token, may also be derived at the gateway 2408. In one aspect, the gateway may send the UL network token and the DL network token to the client device 2410. Optionally, the client device may send the downlink network token to the APP on the PDN 2412

In one aspect, receiving or obtaining a request for a network token and the provisioning of the UL network token and DL network token may be implemented in control messages.

In one aspect, deriving the uplink network token is based on a key known to the gateway and on a parameter associated with the client device and deriving the downlink network token is based on the key known to the gateway and on a parameter associated with an application server.

In one aspect, sending the uplink network token and the downlink network token to the client device further comprises sending the UL network token and the DL network token to a mobility management entity (MME) and sending the uplink network token and the downlink network token to the client device from the MME.

Figure 25:
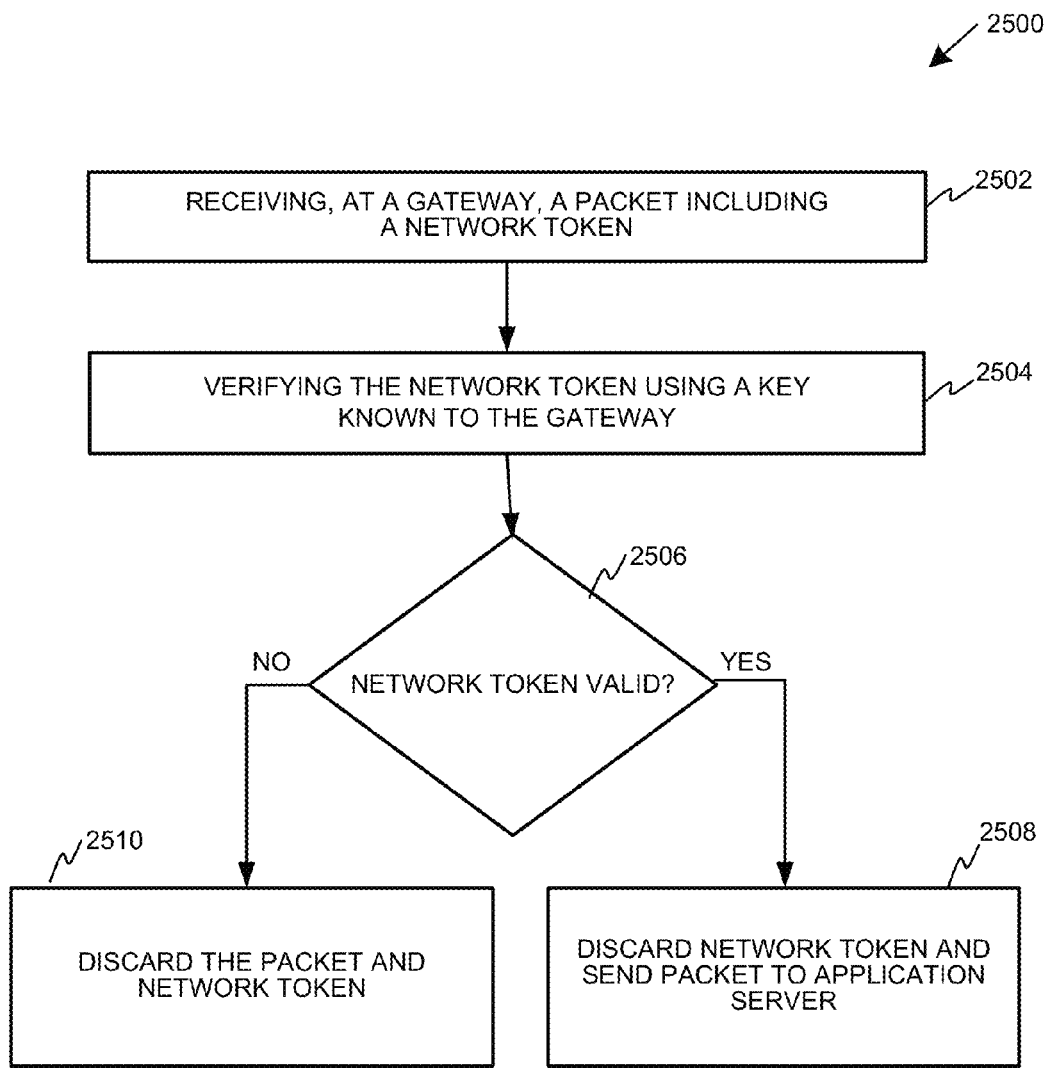
FIG. 25 is flow diagram of an exemplary method, operational at a gateway.

FIG. 25 is flow diagram of an exemplary method 2500, operational at a gateway. The method may include receiving or obtaining, at the gateway, a packet including a network token 2502. The method may continue with validating/verifying the network token using a key known to the gateway 2504. If the network token is valid, 2506, the method may continue by discarding the network token and sending the packet to an application server 2508, if the network token is not valid, 2506, the method may continue by discarding the packet and the network token 2510.

In one aspect verifying the network token may include deriving a verification network token from a function having a set of input parameters including: the key known to the gateway; and a network token parameter index, source Internet protocol (IP) address, source port number, destination IP address, destination port number, protocol identifier (ID), application ID, priority, and/or a quality of service class identifier (QCI); and comparing the network token to the verification network token.

In one aspect, an exemplary method, operational at a gateway may include receiving or obtaining, at the gateway, a packet from an application server, wherein the packet includes a downlink network token, verifying the downlink network token using a key known to the gateway, discarding the packet and downlink network token if the verifying is not successful, and discarding the downlink network token and sending the packet to a client device, based on parameters represented by the downlink network token, if the verifying is successful.

Specific implementations shown and described are only examples and should not be construed as the only way to implement the present disclosure unless specified otherwise herein. It is readily apparent to one of ordinary skill in the art that the various examples in the present disclosure may be practiced by numerous other partitioning solutions.

One or more of the components, acts, features and/or functions described herein and illustrated in the drawings may be rearranged and/or combined into a single component, act, feature, or function or embodied in several components, acts, features, or functions. Additional elements, components, acts, and/or functions may also be added without departing from the invention. The algorithms described herein may also be efficiently implemented in software and/or embedded in hardware.

In the description, elements, circuits, functions, and modules may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It is readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Those of ordinary skill in the art would understand that information and signals may be represented using any of a variety of different technologies and techniques. For example, data, instructions, commands, information, signals, bits, symbols, and chips that may be referenced throughout this description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals, including a single data signal.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

Moreover, a storage medium may represent one or more devices for storing data, including read-only memory (ROM), random access memory (RAM), magnetic disk storage mediums, optical storage mediums, flash memory devices and/or other machine-readable mediums and, processor-readable mediums, and/or computer-readable mediums for storing information. The terms "machine-readable medium," "computer-readable medium," and/or "processor-readable medium" may include, but are not limited to non-transitory mediums such as portable or fixed storage devices, optical storage devices, and various other mediums capable of storing, containing, or carrying instruction(s) and/or data. Thus, the various methods described herein may be fully or partially implemented by instructions and/or data that may be stored in a "machine-readable medium," "computer-readable medium," and/or "processor-readable medium" and executed by one or more processors, machines and/or devices.

Furthermore, embodiments may be implemented by hardware, software, firmware, middleware, microcode, or any combination thereof. When implemented in software, firmware, middleware, or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, elements, circuits, modules, functions, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration. A general-purpose processor, configured for executing embodiments described herein, is considered a special purpose processor for carrying out such embodiments. Similarly, a general-purpose computer is considered a special purpose computer when configured for carrying out embodiments described herein.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, circuits, functions, modules, and algorithm steps described in connection with the embodiments disclosed herein may be implemented as electronic hardware, computer software, or combinations of both. To clearly illustrate this interchangeability of hardware and software, various illustrative elements, components, blocks, circuits, functions, modules, and steps have been described above generally in terms of their functionality. Whether such functionality is implemented as hardware, software, or a combination thereof depends upon the particular application and design selections imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method, operational at a client device, comprising:
establishing a set of one or more flows associated with one or more applications using control plane signaling;
obtaining, at the client device during the control plane signaling, a first network token, wherein the first network token is:
derived based on meta data;
associated with a first flow of the set of one or more flows;
associated with a first application of the one or more applications; and
provisioned to the client device via the control plane signaling; and
transporting the first network token from the client device to a gateway device in:
a shim header in a shim layer between an Internet protocol (IP) layer and a medium access control (MAC) layer;
a packet data convergence protocol (PDCP) header; and/or
an IP extension header as defined in IP version 6 (IPv6).

2. The method of claim 1, further comprising:
sending, from the client device, the first network token with a packet associated with the first flow.

3. The method of claim 1, further comprising:
sending, from the client device, the first network token with every packet sent from the client device that is associated with the first flow.

4. The method of claim 1, wherein the first network token is further derived in accordance with a network access policy.

5. The method of claim 1, wherein the first network token is used to steer a packet in the first flow to the first application.

6. The method of claim 1, wherein:
the first network token is provisioned in response to an implicit request for the first network token; and
the implicit request includes one of either:
a packet data network (PDN) connection request message,
a dedicated bearer activation request message, or
a bearer modification request message.

7. The method of claim 1, wherein when the first network token is transported in the shim header, the first network token is transparent to an access node.

8. The method of claim 1, further comprising:
transporting the first network token from the client device to an access node in:
a shim header in a shim layer between an Internet protocol (IP) layer and a medium access control (MAC) layer; and/or
a packet data convergence protocol (PDCP) header.

9. The method of claim 1, further comprising:
obtaining, at the client device during the control plane signaling, a second network token, wherein the second network token is:
derived by a second device that is different from a first device that derived the first network token;
associated with the first flow of the set of one or more flows;
associated with the first application of the one or more applications; and
provisioned to the client device via the control plane signaling.

10. A client device, comprising:
a network interface; and
a processing circuit coupled to the network interface, the processing circuit configured to:
establish a set of one or more flows associated with one or more applications using control plane signaling;
obtain, at the client device during the control plane signaling, a network token, wherein the network token is:
derived based on meta data;
associated with a first flow of the set of one or more flows;
associated with a first application of the one or more applications; and
provisioned to the client device via the control plane signaling; and
transport the network token from the client device to a gateway device in:
a shim header in a shim layer between an Internet protocol (IP) layer and a medium access control (MAC) layer;
a packet data convergence protocol (PDCP) header; and/or
an IP extension header as defined in IP version 6 (IPv6).

11. The client device of claim 10, wherein the processing circuit is further configured to send the network token with a packet associated with the first flow.

12. The client device of claim 10, wherein the processing circuit is further configured to send the network token with every packet associated with the first flow.

13. The client device of claim 10, wherein the processing circuit is further configured to use data associated with the network token to steer a packet in the first flow to the first application.

14. A method, operational at a gateway device, comprising:
obtaining, at the gateway device, a request for a network token, derived based on meta data, during control plane signaling associated with data connection setup, activation, or modification associated with a client device;
deriving, at the gateway device, the network token, the network token associated with a flow and an application service in accordance with an access policy; and
sending, via control plane signaling, the network token to the client device or to an access node associated with the client device during the control plane signaling,
wherein the network token is derived as an uplink network token and a downlink network token, different from the uplink network token,
derivation of the uplink network token is based a key known to the gateway device and on a parameter associated with the client device, and
derivation of the downlink network token is based on the key known to the gateway device and on a parameter associated with an application server, the method further comprising:
sending the uplink network token and the downlink network token to the client device.

15. The method of claim 14, wherein the network token is used to steer packets transiting between the client device and the application service during transmission over a network through the gateway device.

16. The method of claim 14, wherein the request for the network token is explicit.

17. The method of claim 14, wherein the request for the network token is implicitly recognized upon obtaining, at the gateway device:
- a packet data network (PDN) connection request,
- a dedicated bearer activation request, or
- a bearer modification request.

18. The method of claim 14, wherein derivation of the network token is based on a secret key specific to an access node to which the client device is attached, the method further comprising:
- sending the secret key to the access node.

19. The method of claim 14, further comprising:
- obtaining, at the gateway device, a first packet including the network token; and
- steering a first packet between the client device and the application service using data associated with the network token included with the first packet without use of packet inspection.

20. The method of claim 14, further comprising:
- obtaining, at the gateway device, a first packet including the network token;
- verifying the network token using a key known to the gateway device;
- discarding the first packet including the network token if the verifying is not successful; and
- steering first packet between the client device and the application service using the network token included with the first packet without use of packet inspection if the verifying is successful.

21. The method of claim 20, wherein verifying the network token includes:
- deriving a verification network token from a function having a set of input parameters including:
  - the key known to the gateway device; and
  - a network token parameter index, source Internet protocol (IP) address, source port number, destination IP address, destination port number, protocol identifier (ID), application ID, priority, and/or a quality of service class identifier (QCI); and
- comparing the network token to the verification network token.

22. The method of claim 21, wherein the network token parameter index, source Internet protocol (IP) address, source port number, destination IP address, destination port number, protocol identifier (ID), application ID, priority, and/or quality of service class identifier (QCI) are obtained from the packet.

23. The method of claim 21, further comprising:
- identifying a network token parameter index prior to verifying the network token, wherein the network token parameter index defines a list of input parameters; and
- deriving a verification network token from a function having, as input, the key known to the gateway device and the list of input parameters.

24. The method of claim 23, wherein the network token parameter index further defines an application identifier (ID).

25. The method of claim 23, wherein the list of input parameters is stored in a table in the gateway device.

26. The method of claim 23, wherein the network token is carried in a shim header separate from an IP header.

27. The method of claim 23, wherein the network token is carried in a general packet radio service (GPRS) tunneling protocol (GTP) header.

28. The method of claim 23, wherein the network token is carried in an IP extension header defined in Internet protocol (IP) version 6 (IPv6).

29. A gateway device, comprising:
a network interface; and
a processing circuit coupled to the network interface, the processing circuit configured to:
- obtain a request for a network token, derived based on meta data, during control plane signaling associated with data connection setup, activation, or modification associated with a client device;
- obtain the network token, the network token associated with a flow and an application service in accordance with an access policy; and
- send, via control plane signaling, the network token to the client device or to an access node associated with the client device during the control plane signaling,
wherein the network token is derived as an uplink network token and a downlink network token, different from the uplink network token,
derivation of the uplink network token is based a key known to the gateway device and on a parameter associated with the client device, and
derivation of the downlink network token is based on the key known to the gateway device and on a parameter associated with an application server, the processing circuit configured to:
- send the uplink network token and the downlink network token to the client device.

30. The gateway device of claim 29, wherein the processing circuit is further configured to use the network token to steer packets between the client device and the application service during transmission over a network through the gateway device.

31. The gateway device of claim 29, wherein the processing circuit is further configured to:
- steer a first packet between the client device and the application service using the network token included with the first packet without use of packet inspection.

32. The gateway device of claim 29, wherein the processing circuit obtains the network token by deriving the network token and is further configured to:
- derive the network token based on a secret key specific to an access node to which the client device is attached; and
- send the secret key to the access node.

33. The gateway device of claim 29, wherein the processing circuit obtains the network token by deriving the network token and is further configured to:
- derive the network token as an uplink network token and a downlink network token, different from the uplink network token, wherein:
  - the uplink network token is based a key known to the gateway device and on a parameter associated with the client device, and
  - the downlink network token is based on the key known to the gateway device and on a parameter associated with an application server; and
- send the uplink network token and the downlink network token to the client device.

34. A method, operational at an access node, comprising:
obtaining, at the access node during control plane signaling, a network token, wherein the network token is:
- derived based on meta data;
- associated with a first flow of a set of one or more flows;
- associated with a first application of one or more applications; and
- provisioned to the access node via the control plane signaling, and wherein the network token is derived as an uplink network token and a downlink network token, different from the uplink network token, derivation of the uplink network token is based a key known to a gateway device and on a parameter associated with a client device, and derivation of the downlink network token is based on the key known to the gateway device and on a parameter associated with an application server.

35. The method of claim 34, further comprising:
sending, from the access node, the network token with a packet associated with the first flow.

36. The method of claim 34, further comprising:
sending, from the access node, the network token with every packet associated with the first flow.

37. The method of claim 34, wherein the network token is associated with the set of one or more flows associated with the one or more applications.

38. A method, operational at an access node, comprising:
obtaining, in control plane signaling, a secret key specific to the access node from a gateway device;
obtaining, in user plane signaling, a packet at the access node from a client device, the packet including a network token derived based on meta data;
verifying the network token using a secret key specific to the access node obtained from the gateway device; and
sending the packet and network token to the gateway device if the network token is verified, or
discarding the packet and network token if the network token is not verified,
wherein the network token is to enforce an access policy associated with an application service and the secret key specific to the access node is to validate the network token included in packets received at the access node before sending the packets to the gateway device to prevent unauthorized packets from reaching the gateway device.

39. The method of claim 38 wherein the network token is carried in a general packet radio service (GPRS) tunneling protocol (GTP) header to the gateway device.

40. The method of claim 38, wherein the network token is copied from a packet data convergence protocol (PDCP) header to a general packet radio service tunneling protocol header (GTP header) and carried in the GTP header to the gateway device.

41. An access node, comprising:
a network interface; and
a processing circuit coupled to the network interface, the processing circuit configured to:
obtain, in control plane signaling, a secret key specific to the access node from a gateway device;
obtain, in user plane signaling, a packet at the access node from a client device, the packet including a network token derived based on meta data;
verify the network token using a secret key specific to the access node obtained from a gateway device; and
send the packet and network token to a gateway device if the network token is verified, or
discard the packet and network token if the network token is not verified,
wherein the network token is to enforce an access policy associated with an application service and the secret key specific to the access node is to validate the network token included in packets received at the access node before sending the packets to the gateway device to prevent unauthorized packets from reaching the gateway device.

42. A method, operational at a gateway device, comprising:
obtaining, at the gateway device, a packet from an application server, wherein the packet includes a downlink network token derived based on meta data;
verifying the downlink network token using a key known to the gateway device;
discarding the packet if the verifying is not successful; and
discarding the downlink network token and sending the packet to a client device based on parameters represented by the downlink network token if the verifying is successful,
wherein the downlink network token is to enforce an access policy associated with an application service.

43. The method of claim 42, wherein the packet is an Internet protocol (IP) data packet.

* * * * *

UNITED STATES PATENT AND TRADEMARK OFFICE
CERTIFICATE OF CORRECTION

PATENT NO. : 9,819,596 B2  
APPLICATION NO. : 14/832965  
DATED : November 14, 2017  
INVENTOR(S) : Soo Bum Lee et al.

It is certified that error appears in the above-identified patent and that said Letters Patent is hereby corrected as shown below:

In the Claims

In Claim 14, at Column 34, Line 47, the words "via control plane" are changed to --via the control plane--;
In Claim 14, at Column 34, Line 53, the words "is based a key" are changed to --is based on a key--.
In Claim 19, at Column 35, Line 15, the words "steering a first" are changed to --steering the first--.
In Claim 29, at Column 36, Line 12, the words "via control plane" are changed to --via the control plane--;
In Claim 29, at Column 36, Line 18, the words "is based a key" are changed to --is based on a key--;
In Claim 29, at Column 36, Line 24, the words "circuit configured" are changed to --circuit further configured--.
In Claim 33, at Column 36, Line 50, the words "is based a key" are changed to --is based on a key--.
In Claim 34, at Column 37, Line 4, the words "is based a key" are changed to --is based on a key--.
In Claim 38, at Column 37, Line 28, the words "the packet and network" are changed to --the packet and the network--;
In Claim 38, at Column 37, Line 30, the words "the packet and network" are changed to --the packet and the network--.
In Claim 41, at Column 38, Line 14, the words "the packet and network" are changed to --the packet and the network--;
In Claim 41, at Column 38, Line 16, the words "the packet and network" are changed to --the packet and the network--.

Signed and Sealed this  
Twenty-second Day of May, 2018

Andrei Iancu  
*Director of the United States Patent and Trademark Office*